US010572073B2

(12) United States Patent
Tamura et al.

(10) Patent No.: US 10,572,073 B2
(45) Date of Patent: Feb. 25, 2020

(54) INFORMATION PROCESSING DEVICE, INFORMATION PROCESSING METHOD, AND PROGRAM

(71) Applicant: SONY CORPORATION, Tokyo (JP)

(72) Inventors: Shigefumi Tamura, Tokyo (JP); Ryosuke Nomura, Kanagawa (JP); Tetsuo Ikeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/735,466

(22) PCT Filed: May 20, 2016

(86) PCT No.: PCT/JP2016/065029
§ 371 (c)(1),
(2) Date: Dec. 11, 2017

(87) PCT Pub. No.: WO2017/033513
PCT Pub. Date: Mar. 2, 2017

(65) Prior Publication Data
US 2018/0188840 A1    Jul. 5, 2018

(30) Foreign Application Priority Data

Aug. 24, 2015 (JP) ................. 2015-164353

(51) Int. Cl.
G06F 3/043 (2006.01)
G06F 3/0484 (2013.01)
(Continued)

(52) U.S. Cl.
CPC ............ *G06F 3/043* (2013.01); *G06F 3/0425* (2013.01); *G06F 3/0484* (2013.01);
(Continued)

(58) Field of Classification Search
None
See application file for complete search history.

(56) References Cited

U.S. PATENT DOCUMENTS 9,866,957 B2*  1/2018  Katagiri ................ H04R 3/005
2012/0076316 A1*  3/2012  Zhu ........................ H04R 3/005
                                                                381/71.11
(Continued)

FOREIGN PATENT DOCUMENTS

JP      2011-102984 A     5/2011
JP      2014-241005 A     12/2014
WO      WO2015/098190 A1  7/2015

OTHER PUBLICATIONS

Machine translation of WO 2015/0984190 with paragraph correspondence to original document wich is already on record.*

Primary Examiner — Kent W Chang
Assistant Examiner — Benjamin Morales
(74) Attorney, Agent, or Firm — Paratus Law Group, PLLC

(57) ABSTRACT

There is provided an information processing device, an information processing method, and a program which are capable of inputting information input by a plurality of users to targets manipulated by the users even in a situation in which the plurality of users perform manipulations at the same time, the information processing device including: an acquiring unit configured to identify and acquire input information from each of a plurality of target regions serving as acquisition sources of the input information, for each of the target regions; and a control unit configured to associate each of at least one or more applications with any of the plurality of target regions, and allocate the input information acquired from the target region to the application associated with the target region.

20 Claims, 23 Drawing Sheets

(51) Int. Cl.
*H04R 3/12* (2006.01)
*G06F 3/0488* (2013.01)
*G06F 3/042* (2006.01)
*G06F 3/16* (2006.01)
*H04R 3/00* (2006.01)
*H04R 1/40* (2006.01)

(52) U.S. Cl.
CPC .......... *G06F 3/04886* (2013.01); *G06F 3/167* (2013.01); *H04R 3/005* (2013.01); *H04R 3/12* (2013.01); *H04R 1/406* (2013.01); *H04R 2430/20* (2013.01); *H04R 2499/15* (2013.01)

(56) References Cited

U.S. PATENT DOCUMENTS

| | | | | |
|---|---|---|---|---|
| 2014/0362002 | A1* | 12/2014 | Nakasu | G06F 3/0488 |
| | | | | 345/173 |
| 2016/0021478 | A1* | 1/2016 | Katagiri | H04S 7/30 |
| | | | | 381/26 |
| 2016/0064002 | A1* | 3/2016 | Kim | G10L 15/22 |
| | | | | 704/246 |

* cited by examiner

| REGION | PRIORITY | APPLICATION | MODE |
|---|---|---|---|
| 210–240 | 1 | A42: WEB BROWSER | Exclusive |
| 135–225 | 2 | A43: MAP | Exclusive |
| | | | |
| | | | |
| | | | |

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2016/065029 (filed on May 20, 2016) under 35 U.S.C. § 371, which claims priority to Japanese Patent Application No. 2015-164353 (filed on Aug. 24, 2015), which are all hereby incorporated by reference in their entirety.

TECHNICAL FIELD

The present disclosure relates to an information processing device, an information processing method, and a program.

BACKGROUND ART

Devices which display various information in accordance with a manipulation on a touch panel such as smart phones and tablet terminals have become widespread. For tablet terminals, a screen size has become larger, and uses that enable a plurality of users to perform a manipulation at the same time have been taken into consideration as well. Further, there are cases in which a projector is used as a device for displaying information.

In addition, in recent years, methods of inputting information to an information processing device such as a smartphone or a tablet terminal have also diversified, and for example, there are information processing devices capable of using a collected sound or a captured video as input information.

CITATION LIST

Patent Literature

Patent Literature 1: JP 2011-102984A

DISCLOSURE OF INVENTION

Technical Problem

On the other hand, in a situation in which a plurality of users manipulate an information processing device at the same time, a plurality of targets (for example, applications) manipulated by the respective users may operate simultaneously, and a plurality of users may input information to the respective targets. For this reason, there is a demand for a mechanism of identifying and acquiring input information from each of a plurality of users, determining a target manipulated by the user, and inputting the acquired input information to the determined target.

In this regard, the present disclosure proposes an information processing device, an information processing method, and a program which are capable of inputting information input by a plurality of users to targets manipulated by the users even in a situation in which the plurality of users perform manipulations at the same time.

Solution to Problem

According to the present disclosure, there is provided an information processing device including: an acquiring unit configured to identify and acquire input information from each of a plurality of target regions serving as acquisition sources of the input information, for each of the target regions and a control unit configured to associate each of at least one or more applications with any of the plurality of target regions, and allocate the input information acquired from the target region to the application associated with the target region.

In addition, according to the present disclosure, there is provided an information processing method including: identifying and acquiring input information from each of a plurality of target regions serving as acquisition sources of the input information, for each of the target regions; and associating, by a processor, each of at least one or more applications with any of the plurality of target regions, and allocating the input information acquired from the target region to the application associated with the target region.

In addition, according to the present disclosure, there is provided a program causing a computer to execute: identifying and acquiring input information from each of a plurality of target regions serving as acquisition sources of the input information, for each of the target regions; and associating each of at least one or more applications with any of the plurality of target regions, and allocating the input information acquired from the target region to the application associated with the target region.

Advantageous Effects of Invention

As described above, according to the present disclosure, an information processing device, an information processing method, and a program which are capable of inputting information input by a plurality of users to targets manipulated by the users even in a situation in which the plurality of users perform manipulations at the same time are provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
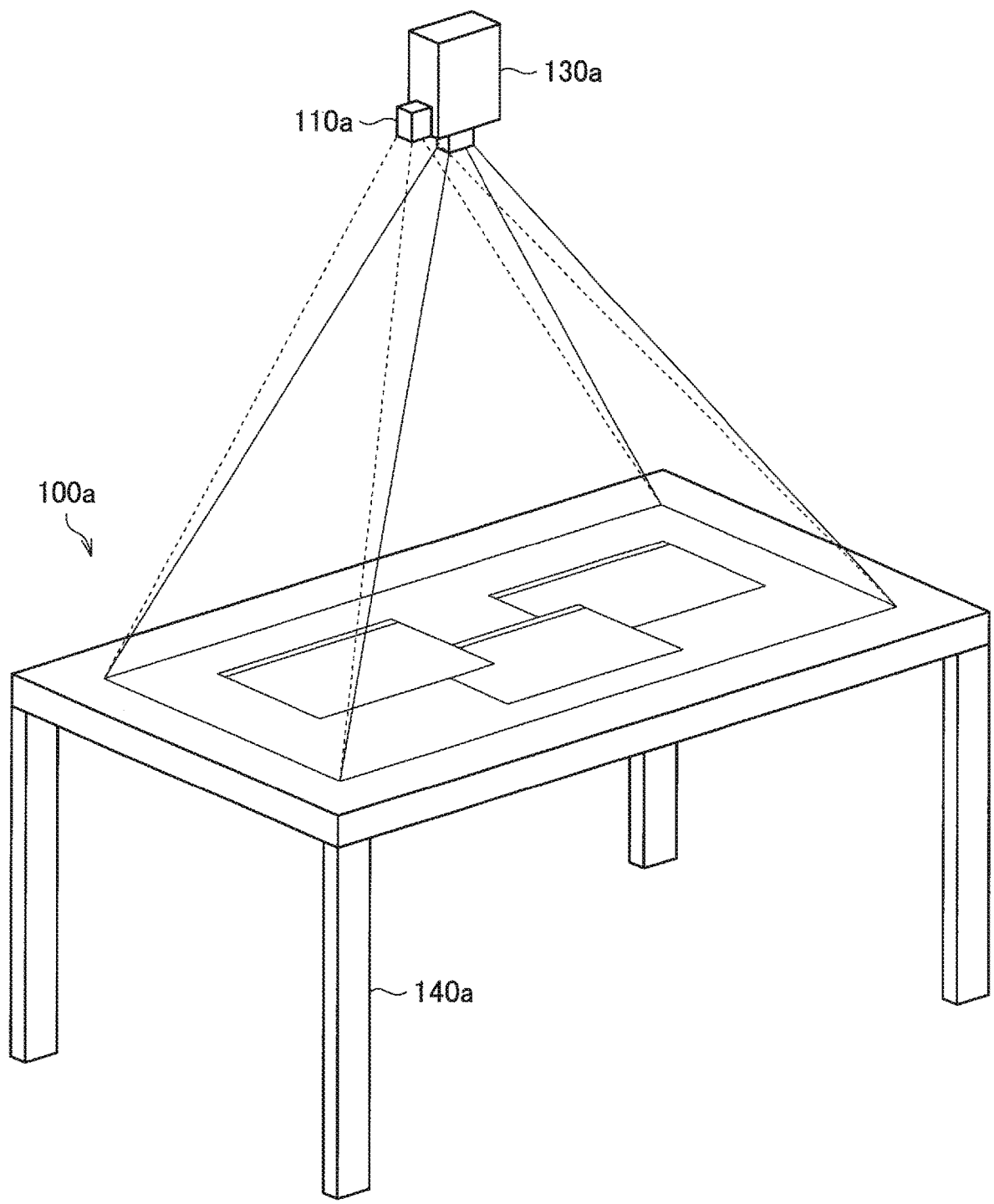
FIG. 1 is an explanatory diagram illustrating a configuration example of an information processing device according to one embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that, the description will proceed in the following order.

1.1. First embodiment
1.1. Configuration example
1.2. Overview of control
1.2.1. Acquisition of sound from each user
1.2.2. Specifying of input destination of voice input
1.3. Functional configuration
1.4. Process
1.5. Modified examples
1.5.1. First modified example: first control example in case in which there are plurality of input destination candidates
1.5.2. Second modified example: second control example in case in which there are plurality of input destination candidates
1.5.3. Third modified example: notification of information indicating each region
1.5.4. Fourth modified example: output amount control example
1.5.5. Fifth modified example: region control example
1.5.6. Sixth modified example: control example of input destination of input information
1.6. Conclusion
2. Second embodiment
2.1. Overview
2.2. Functional configuration
3. Hardware configuration example
4. Conclusion

1. FIRST EMBODIMENT 1.1. Configuration Example

First, a configuration example of an information processing device according to one embodiment of the present disclosure will be described with reference to the drawings. FIG. 1 is an explanatory diagram illustrating the configuration example of the information processing device according to one embodiment of the present disclosure. Hereinafter, the configuration example of the information processing device according to one embodiment of the present disclosure will be described with reference to FIG. 1.

As illustrated in FIG. 1, an information processing device 100a according to one embodiment of the present disclosure includes an input unit 110a and an output unit 130a. The information processing device 100a according to one embodiment of the present disclosure illustrated in FIG. 1 causes information to be displayed on a top surface of a table 140a and enables a user using the information processing device 100a to perform a manipulation on the information displayed on the table 140a. Note that, hereinafter, a scheme of displaying information on the top surface of the table 140a as illustrated in FIG. 1 is also referred to as a "projection type." Further, the information processing device 100a may be configured as an information processing system to which at least one of the input unit 110a and the output unit 130a is externally attached as an external device.

The input unit 110a is a device for inputting manipulation content of the user using the information processing device 100a, a shape or a pattern of an object placed on the table 140a, or the like. In the example illustrated in FIG. 1, the input unit 110a is provided above the table 140a, for example, such that the input unit 110a is hung from a ceiling. In other words, the input unit 110a is disposed separately from the table 140a serving as the target on which information is displayed. As the input unit 110a, for example, a camera for imaging the table 140a through one imaging optical system (for example, a series of lens groups), a stereo camera capable of imaging the table 140a through two imaging optical systems and recording information of a depth direction, or a sound collecting device (for example, a microphone or the like) for collecting acoustic information such as a voice spoken by the user using the information processing device 100a or an ambient sound of an environment in which the information processing device 100a is placed may be used.

In the case in which the camera for imaging the table 140a through one imaging optical system is used as the input unit 110a, for example, the information processing device 100a analyzes an image captured by the camera and detects an object placed on the table 140a. In a case in which the stereo camera is used as the input unit 110a, for example, a visible light camera, an infrared camera, or the like can be applied as the stereo camera. When the stereo camera is used as the input unit 110a, the input unit 110a can acquire depth information. When the depth information is acquired by the input unit 110a, for example, the information processing device 100a can detect a real object such as a hand or an object placed on the table 140a. Further, when the input unit 110a acquires the depth information, the information processing device 100a can detect a contact and an approach of a manipulator such as the hand of the user to the table 140a and separation of the manipulator from the table 140a. Note that, in the following description, bringing the manipulator such as the hand into contact with or causing it to approach an information display surface by the user is also collectively referred to as "contact", simply.

In addition, in a case in which a microphone is used as the input unit 110a, a microphone array for collecting acoustic information (for example, a sound) in a specific direction may be used as the microphone. In a case in which the microphone array is used as the input unit 110a, the information processing device 100a may adjust a sound collection direction of the microphone array to an arbitrary direction. Further, the information processing device 100a may estimate an arrival direction of the acoustic information in accordance with a sound collection result of the acoustic information acquired by each of microphones included in the microphone array. As a specific example, the information processing device 100a may estimate the arrival direction of the acoustic information in accordance with a ratio of a volume of each piece of acoustic information collected by each of the microphones included in the array microphone.

Additionally, hereinafter, a case in which a manipulation by the user with a manipulator such as a hand is detected from an image captured by the input unit 110a will be mainly described. However, the present disclosure is not limited to the related example. A manipulation by the user may be detected by a touch panel that detects touch of a finger of the user. In addition, examples of the user manipulation that can be acquired by the input unit 110a may include a stylus manipulation toward an information display surface, a gesture manipulation toward a camera, or the like.

The output unit 130a is a configuration for displaying information on the table 140a or outputting a sound in accordance with information regarding manipulation content input by the input unit 110a by the user using the information processing device 100a, content of information output by the output unit 130a, the shape or design of an object placed on the table 140a, or the like. For example, a projector, a speaker, or the like is used as the output unit 130a. In the example illustrated in FIG. 1, for example, the output unit 130a is provided above the table 140a to be suspended from the ceiling. In a case where the output unit 130a is configured as a projector, the output unit 130a projects information on the top surface of the table 140a. In a case where the output unit 130a is configured as a speaker, the output unit 130a outputs a sound on the basis of a sound signal. In the case where the output unit 130a is configured as a speaker, the number of speakers may be one or plural. In a case where the output unit 130a is configured as a plurality of speakers, the information processing device 100a may limit the speakers outputting sounds or adjust a sound output direction.

In addition, in a case where the information processing device 100a is of a projection type, as illustrated in FIG. 1, the output unit 130a may include an illumination device. In a case where the output unit 130a includes an illumination device, the information processing device 100a may control an on or off state or the like of the illumination device on the basis of the content of information input by the input unit 110a.

The user using the information processing device 100a can place his or her finger or the like on the table 140a to manipulate information displayed on the table 140a by the output unit 130a. In addition, the user using the information processing device 100a can place an object on the table 140a, cause the input unit 110a to recognize the object, and execute various manipulations on the recognized object (that is, a real object).

Although not illustrated in FIG. 1, another device may be connected to the information processing device 100a. For example, an illumination device for illuminating the table 140a may be connected to the information processing device 100a. When the illumination device for illuminating the table 140a is connected to the information processing device 100a, the information processing device 100a can control a lighting state of the illumination device in accordance with a state of an information display surface.

Figure 2:
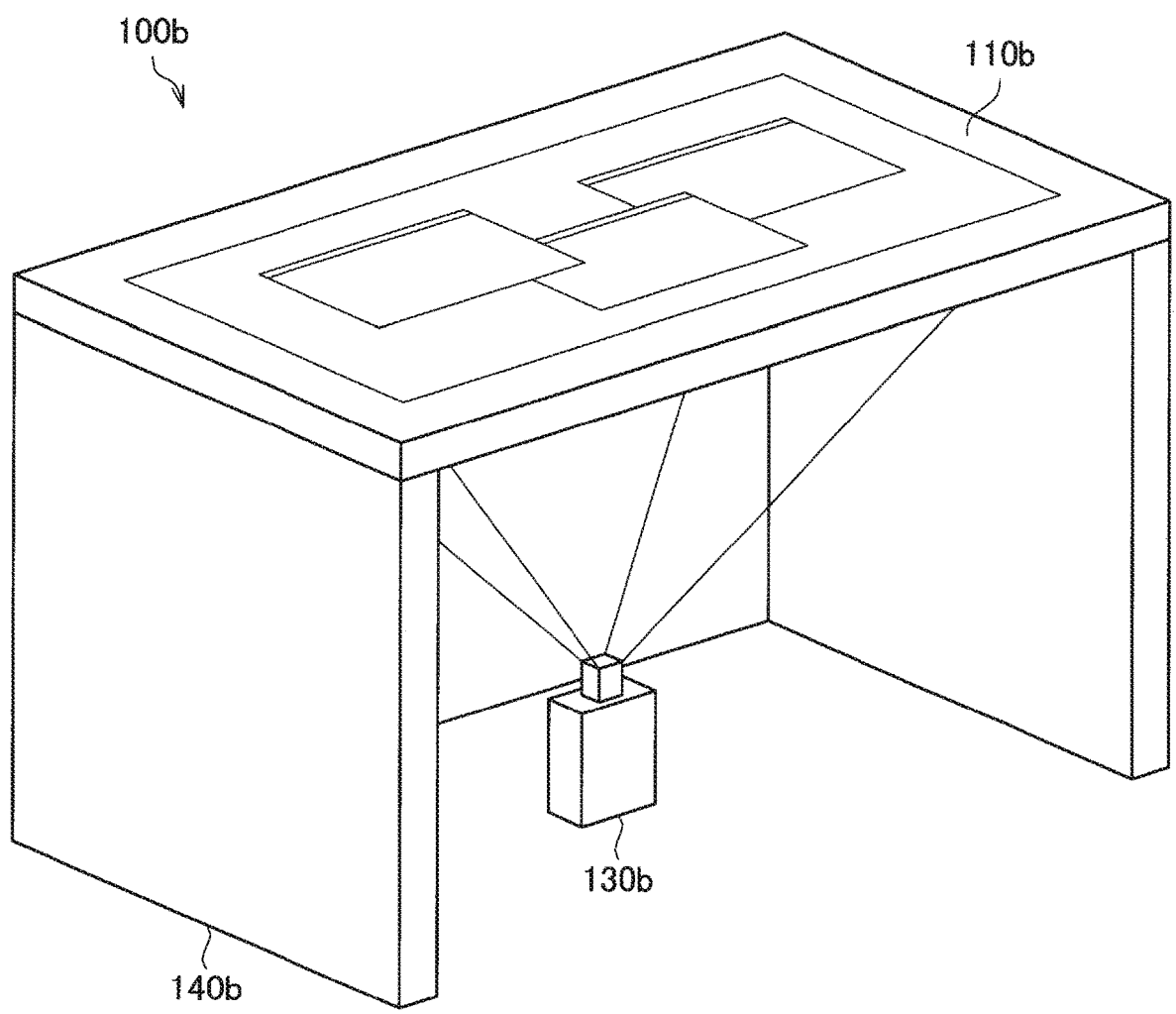
FIG. 2 is an explanatory diagram illustrating a configuration example of an information processing device according to one embodiment of the present disclosure.
Figure 3:
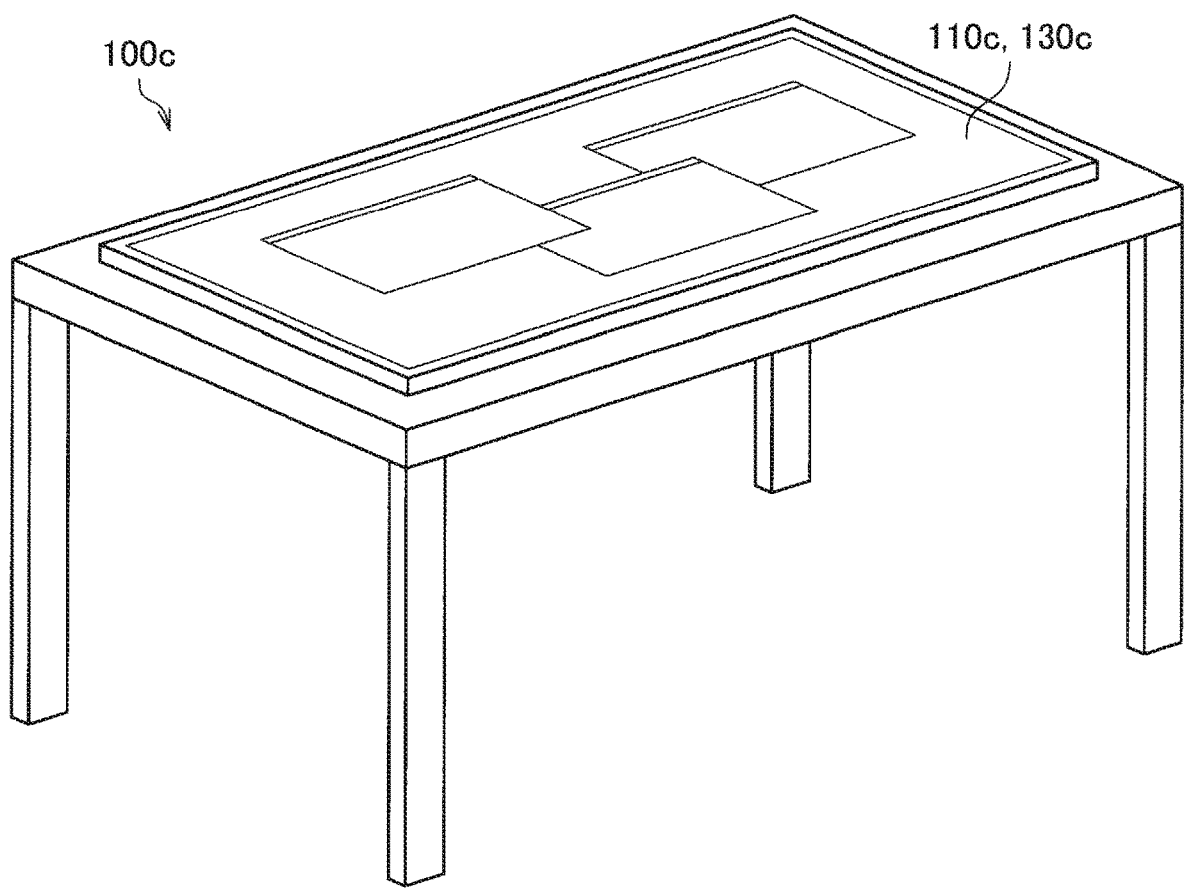
FIG. 3 is an explanatory diagram illustrating a configuration example of an information processing device according to one embodiment of the present disclosure.

In addition, in the present disclosure, the form of the information processing device is not limited to the form illustrated in FIG. 1. FIGS. 2 and 3 are explanatory diagrams illustrating examples of other new forms of an information processing device according to an embodiment of the present disclosure.

FIG. 2 is an explanatory diagram illustrating an example of the configuration of an information processing device 100b according to an embodiment of the present disclosure. The information processing device is configured to display the information on the front surface of a table 140b by causing the output unit 130a to radiate information from the lower side of the table 140b. That is, in the information processing device 100b illustrated in FIG. 2, the information display surface is the top surface of the table 140b. The surface of the table 140b is formed of a transparent material such as a glass plate or a transparent plastic plate. A scheme of causing the output unit 130a to radiate information from the lower side of the table 140b and displaying the information on the top surface of the table 140b as in FIG. 2 is also referred to as a "rear projection type." In the example illustrated in FIG. 2, a configuration in which an input unit 110b is provided on the front surface of the table 140b is illustrated. However, as with the information processing device 100a illustrated in FIG. 1, the input unit 110b may be provided below the table 140b to be separated from the table 140b.

FIG. 3 is an explanatory diagram illustrating an example of the configuration of an information processing device 100c according to an embodiment of the present disclosure. FIG. 3 illustrates a state in which a touch panel type display is placed on a table. In this way, in the case of a touch panel type display, an input unit 110c and an output unit 130c can be configured as a touch panel type display. That is, in the information processing device 100c illustrated in FIG. 3, an information display surface is the touch panel type display. In the information processing device 100c illustrated in FIG. 3, a camera for detecting the position of a user may be provided above the touch panel type display, as with the information processing device 100a illustrated in FIG. 1.

Note that, in the following description, as illustrated in FIG. 1, a configuration of the information processing device 100a in which the input unit 110a and the output unit 130a are disposed above the table 140a, that is, the information processing device 100a in which the input unit 110a and the output unit 130a are disposed apart from the information display surface, will be described as an example. In the following description, the information processing device 100a, the input unit 110a, and the output unit 130a are simply referred to as the information processing device 100, the input unit 110, and the output unit 130 as well.

1.2. Overview of Control

Next, in order to facilitate understanding of features of the information processing device 100 according to one embodiment of the present disclosure, first, problems of the information processing device 100 according to the present embodiment will be organized, and then an overview of control performed by the information processing device 100 according to the present embodiment will be described.

Figure 4:
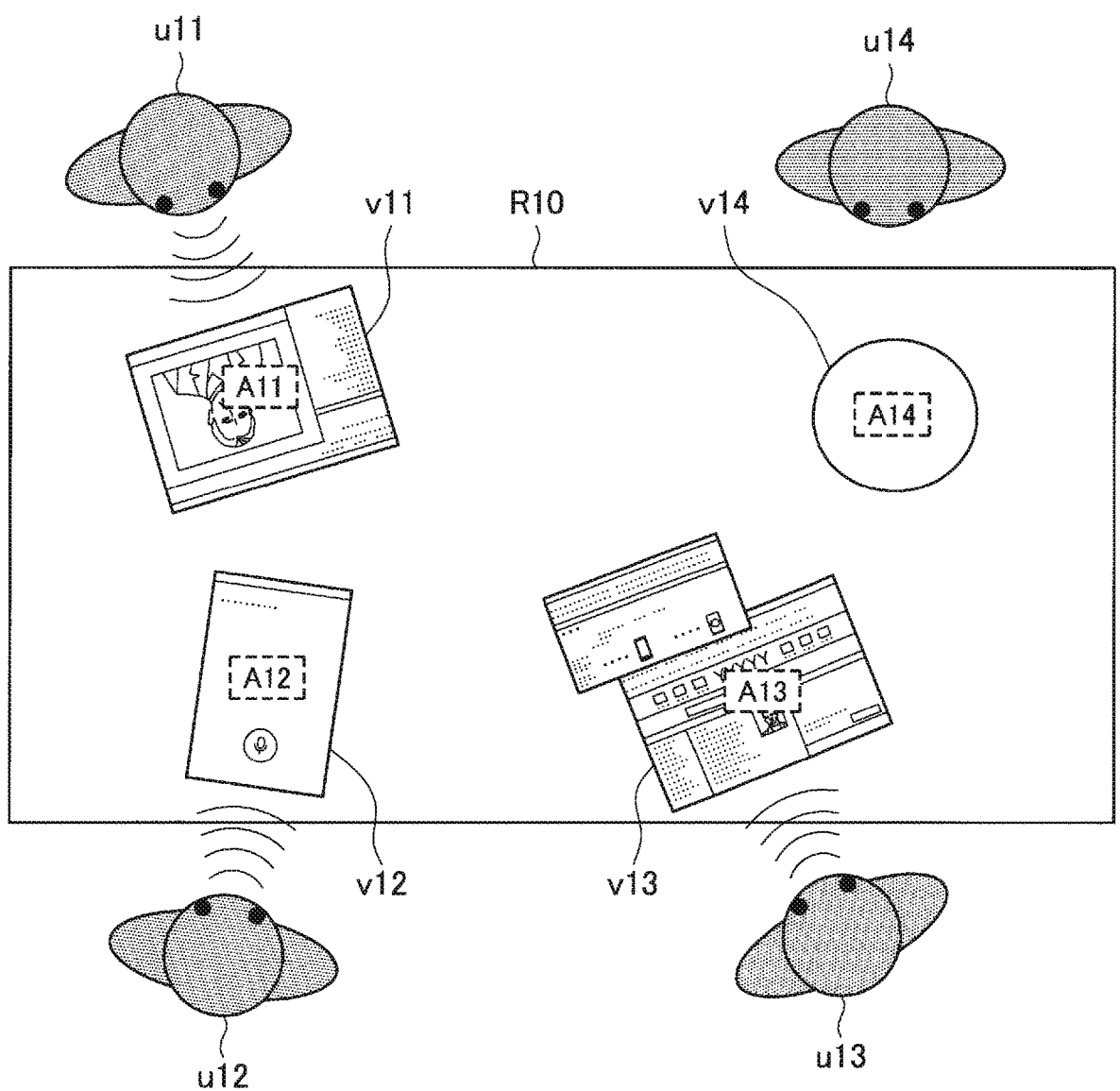
FIG. 4 is an explanatory diagram for describing an overview of an information processing device according to a first embodiment of the present disclosure.

First, the problems of the information processing device 100 according to the present embodiment will be organized with reference to FIG. 4. FIG. 4 is an explanatory diagram for describing the overview of the information processing device 100 according to the present embodiment and illustrates an example in which a plurality of users simultaneously perform manipulations on the information processing device 100. The information processing device 100 according to the present embodiment implements an environment in which a relatively large manipulation screen is projected onto a top surface of a table so that a plurality of users can simultaneously perform a manipulation, for example, as illustrated in FIG. 4.

In FIG. 4, reference numeral R10 schematically indicates a region in which the information processing device 100 displays information (that is, an information display surface). Note that, in the case of the projection type information processing device 100, a projection plane onto which the manipulation screen is projected by the projector corresponds to the display surface R10. In addition, each of reference numerals v11 to v14 indicates an example of a display object (for example, a display component such as a window) displayed on the information display surface R10 in accordance with an operation of each application when different applications are executed.

In the example illustrated in FIG. 4, a user u11 inputs information to a manipulation screen of a video chat application A11 indicated by reference numeral v11 by voice. Further, a user u12 inputs information to an input screen of an application A12 for a voice search indicated by reference numeral v12 by voice. Similarly, a user u13 inputs information to a screen of a browser A13 indicated by reference numeral v13 by voice.

In addition, in the example illustrated in FIG. 4, a user u14 does not manipulate the information processing device 100. Further, in the example illustrated in FIG. 4, in addition to the applications A11 to A13 manipulated by the users u11 to u13, an application A14 of a music player is operating. Note that, in the present description, the music player application A14 may display the manipulation screen v14 on the display surface R10 but does not have to display the manipulation screen v14 on the display surface R10.

As illustrated in FIG. 4, in a situation in which a plurality of users manipulate an information processing device 100 at the same time, a plurality of targets (for example, applications) manipulated by the respective users may operate simultaneously, and a plurality of users may input information to the targets.

Under such a situation, in a case in which each user inputs information by voice, for example, like a case in which a manipulation is performed by a voice input, the user does not always explicitly designate an application serving as a target. Further, in the information processing device 100, when the voices spoken by the users are simply collected, it may be difficult to identify and acquire the voices spoken by the users. For this reason, as illustrated in FIG. 4, under the situation in which the respective applications manipulated by a plurality of users operate simultaneously, it may be difficult for the information processing device 100 to specify respective applications serving as the input destinations of collected voices.

The information processing device 100 according to one embodiment of the present disclosure was made in light of the situation described above, and a mechanism capable of inputting input information (for example, a voice input) from each user to the target (for example, an application) manipulated by the user even in the situation in which the plurality of users simultaneously perform manipulations is provided.

In this regard, the overview of control performed by the information processing device 100 according to the present embodiment will be described with reference to FIGS. 5 to 7, particularly focusing on an operation in a case in which each user inputs information by voice.

1.2.1. Acquisition of Sound from Each the User

First, an example of a mechanism in which the information processing device 100 according to the present embodiment identifies and acquires voices spoken by a plurality of users will be described with reference to FIG. 5. FIG. 5 is an explanatory diagram for describing the overview of control performed by the information processing device 100 according to the present embodiment and a diagram for describing an example of a mechanism in which the information processing device 100 identifies and acquires the voices spoken by the respective users.

The information processing device 100 according to the present embodiment includes a microphone array including a plurality of sound collecting units 113 (for example, microphones) as the input unit 110 for collecting the acoustic information such as the voice spoken by the user, and estimates the arrival direction of the acoustic information in accordance with the sound collection results of the acoustic information by the respective sound collecting units 113. Note that, in the present description, an example in which an omnidirectional microphone is applied as each sound collecting unit 113 will be described.

For example, in FIG. 5, reference numeral R20 schematically indicates a region in which the input unit 110 including the plurality of sound collecting units 113 can collect the acoustic information (hereinafter also referred to as a "sound collection region"). Further, reference numeral R21 indicates each partial region in a case in which the sound collection region R20 is divided into a plurality of partial regions in accordance with directions using the position of the input unit 110 as a base point.

Here, the acoustic information arriving from the direction in which a partial region R21a extends using the position of the input unit 110 as the base point is assumed to be collected by the sound collecting units 113 in the input unit 110. In this case, the acoustic information collected by the sound collecting unit 113a facing the direction in which the partial region R21a extends among the plurality of sound collecting units 113 may have the highest volume. Further, the acoustic information arriving from the direction in which the partial region R21a extends may also be collected by the sound collecting units 113b and 113c adjacent to the sound collecting unit 113a. In this case, the volume of the acoustic information collected by the sound collecting units 113b and 113c is usually lower than the volume of the acoustic information collected by the sound collecting unit 113a. Further, in most cases, the acoustic information arriving from the direction in which the partial region R21a extends is hardly collected by the sound collecting unit 113d positioned on an opposite side to the sound collecting unit 113a.

By using such characteristics, for example, the information processing device 100 estimates the arrival direction of the acoustic information (that is, the partial region R21 in which the sound source of the acoustic information is positioned) in accordance with the ratio of the volume of each piece of acoustic information collected by the plurality of sound collecting units 113 included in the input unit 110 (for example, the array microphone).

With this configuration, the information processing device 100 identifies and acquires a piece of acoustic information arriving from each of a plurality of partial regions R21 into which the sound collection region R20 of the input unit 110 is divided. In other words, according to the configuration described above, the information processing device 100 can identify and acquire the voice spoken by the user positioned in the partial region R21 for each partial region R21.

Note that, a resolution of the partial region R21 (in other words, the arrival direction) in which the information processing device 100 can identify and acquire each piece of acoustic information depends on the number of sound collecting units 113 serving as the input unit 110 and an arrangement of each of the sound collecting units 113.

Further, the above described configuration of the input unit 110 is merely an example, and the configuration of the input unit 110 is not limited to the above configuration as long as it is possible to identify and acquire a piece of acoustic information arriving from each of the divided partial regions R21 into which the sound collection region R20 of the input unit 110 is divided. As a specific example, a directional microphone may be applied as each of the sound collecting units 113 serving as the input unit 110. In this case, the information processing device 100 may estimate the arrival direction of the acoustic information (that is, the partial region R21 in which the sound source of the acoustic information is positioned), for example, in accordance with the sound collecting unit 113 that collects the acoustic information among the plurality of sound collecting units 113. As long as the acoustic information arriving from each partial region R21 can be identified and acquired, a method of dividing the sound collection region R20 into the plurality of partial regions R21 is not limited to the division method according to the direction using the position of the input unit 110 as the base point.

1.2.2. Specifying of Input Destination of Voice Input

Next, an example of a mechanism in which the information processing device 100 according to the present embodiment specifies the input destination of the acoustic information acquired via the input unit 110 will be described with reference to FIGS. 6 and 7. FIGS. 6 and 7 are explanatory diagrams for describing an overview of control performed by the information processing device 100 according to the present embodiment and a mechanism in which the information processing device 100 specifies an input destination of the acquired acoustic information.

Figure 5:
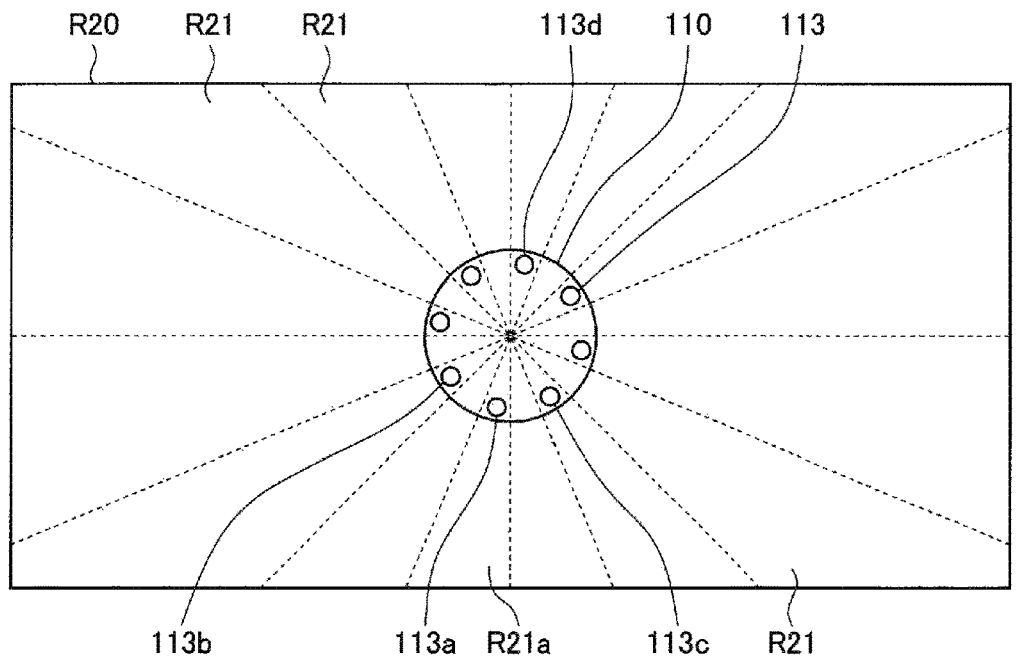
FIG. 5 is an explanatory diagram for describing an overview of control performed by the information processing device according to the embodiment.

The information processing device 100 according to the present embodiment associates applications with any of the partial regions R21 in the sound collection region R20 of the input unit 110 illustrated in FIG. 5 in accordance with a state or context of an application being operated. Note that, in the present description, in order to facilitate understanding of the control of the information processing device 100, the display surface R10 is assumed to substantially coincide with the sound collection region R20 of the input unit 110 as illustrated in FIGS. 6 and 7. However, the display surface R10 and the sound collection region R20 need not necessarily have the same size or position. The partial region R21 in the region R20 corresponds to an example of a "target region."

Figure 6:
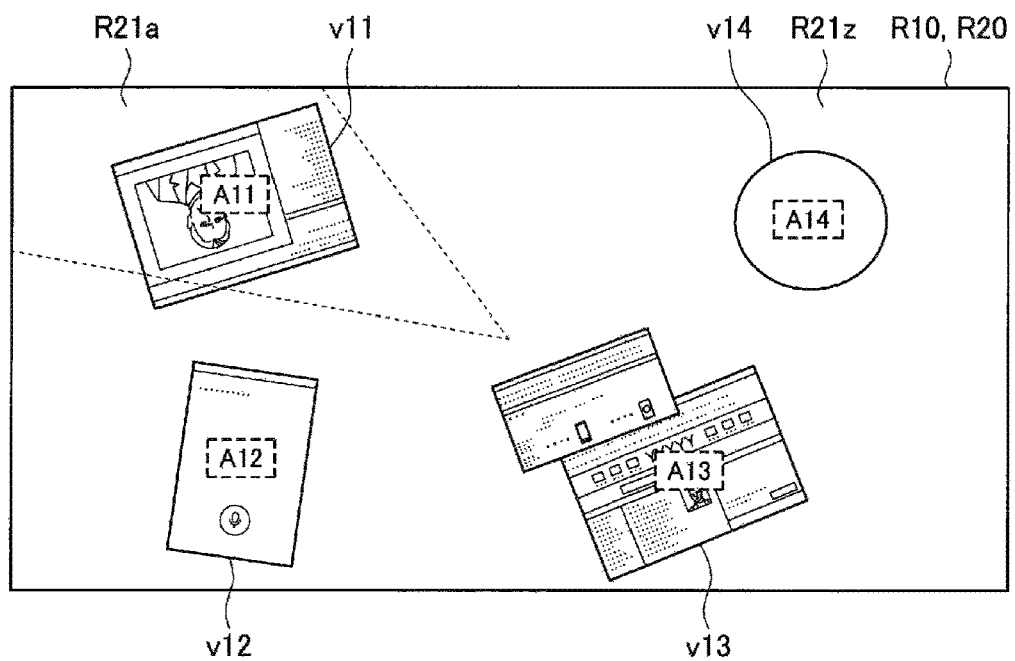
FIG. 6 is an explanatory diagram for describing an overview of control performed by the information processing device according to the embodiment.

For example, FIG. 6 schematically illustrates a state in which only the video chat application A11 among the applications A11 to A14 is receiving or is able to receive a voice input from the user. Note that, in the following description, the state in which the application is receiving the voice input from the user or the state in which the application is able to receive the voice input from the user is also referred to as an "active state." Further, a state in which the application does not receive the voice input from the user (for example, the state in which reception of an input is temporarily stopped) is also referred to as an "inactive state."

In the example illustrated in FIG. 6, the information processing device 100 associates the application A11 in the active state with the partial region R21a in the sound collection region R20 among the applications A11 to A14 that are in operation.

In this case, the information processing device 100 checks that the application A11 transitions to the activate state in a case in which the application A11 is activated, in a case in which the application A11 starts the reception of the voice input, or in a case in which the voice input is acquired. Note that, the information processing device 100 can recognize a timing at which the application A11 starts the reception of the voice input, for example, on the basis of a predetermined manipulation corresponding to the application A11 (for example, a predetermined touch manipulation performed on the display object v11).

The information processing device 100 specifies the size or the position of the partial region R21 in the sound collection region R20 to be associated with the application A11 on the basis of the state or the context of the application A11 that has transitioned to the active state.

For example, in the example illustrated in FIG. 6, the information processing device 100 associates the partial region R21a superimposed on the display object v11 corresponding to the application A11 in the sound collection region R20, with the application A11. In this case, for example, the information processing device 100 preferably specifies the partial region R21 to be associated with the application serving as the target on the basis of at least one or more pieces of information of a position, a direction, and a size of the display object of the application (for example, the manipulation screen or the like).

As a specific example, the information processing device 100 estimates the position of the user on the basis of the information such as the position, the direction, the size, or the like of the display object under the assumption that the user performs a manipulation while facing the display object of the application serving as the target. Further, it will be appreciated that the position of the user estimated at this time corresponds to the position of the sound source of the voice input toward the target application.

In addition, as another example, the information processing device 100 may specify the partial region R21 to be associated with the application serving as the target in accordance with the type of application. Note that, the above example is merely an example, and the method is not particularly limited as long as the information processing device 100 is able to specify the partial region R21 to be associated with the application serving as the target in accordance with information related to the application.

Further, in the example illustrated in FIG. 6, the information processing device 100 may associate, for example, management software operating at an operating system (OS) level (for example, a sound agent) with a partial region R21z other than the partial region R21a in the sound collection region R20. Note that, in the following description, the sound agent is assumed to operate as the management software at the OS level.

Next, in the example illustrated in FIG. 6, in a case in which the acoustic information arriving from the partial region R21a (for example, the sound spoken by the user positioned in the partial region R21a) is acquired, the information processing device 100 allocates (in other words, inputs) the acoustic information to the application A11 associated with the partial region R21a. Further, in a case in which the acoustic information arriving from a partial region R21 other than the partial region R21a, that is, the partial region R21z, is acquired, the information processing device 100 allocates the acoustic information to the sound agent.

Figure 7:
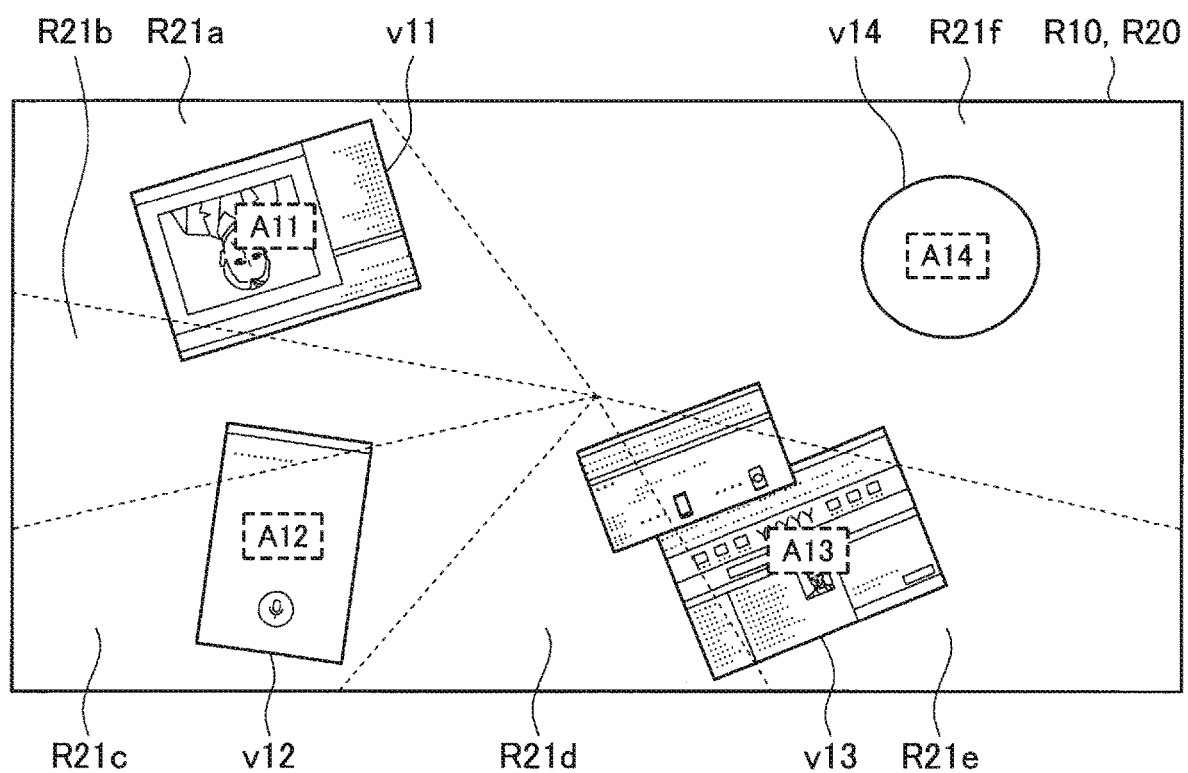
FIG. 7 is an explanatory diagram for describing an overview of control performed by the information processing device according to the embodiment.

Further, FIG. 7 schematically illustrates an example in which the applications A12 and A13 enter the active state from the state illustrated in FIG. 6. In this case, the information processing device 100 specifies the sizes or the positions of the partial regions R21 in the sound collection region R20 which is to be associated with the application A12 and A13 on the basis of the states or the contexts of the application A12 and A13 that have transitioned to the active state.

As a specific example, the information processing device 100 associates a partial region R21c superimposed on the display object v12 corresponding to the application A12 in the sound collection region R20, with the application A12. Similarly, the information processing device 100 associates a partial region R21e superimposed on the display object v13 corresponding to the application A13 in the sound collection region R20, with the application A12.

In addition, in the example illustrated in FIG. 7, the information processing device 100 associates partial regions R21b, R21d, and R21f with which the application in the active state is not associated, with the sound agent operating at the OS level.

In other words, in the example illustrated in FIG. 7, in a case in which the acoustic information arriving from the partial region R21c is acquired, the information processing device 100 allocates the acoustic information to the application A13 associated with the partial region R21c. Similarly, in a case in which the acoustic information arriving from the partial region R21e is acquired, the information processing device 100 allocates the acoustic information to the application A14 associated with the partial region R21e. Further, in a case in which the acoustic information arriving from a partial regions R21 other than the partial regions R21a, R21c, and R21e, that is, at least one of the partial regions R21b, R21d, and R21f, is acquired, the information processing device 100 allocates the acoustic information to the sound agent.

As described above, the information processing device 100 estimates the partial region R21 in which the sound source of the acoustic information is positioned (that is, the arrival direction of the acoustic information) in accordance with the sound collection result of the acoustic information acquired by each of a plurality of sound collecting units 113 included in the input unit 110. With this configuration, the information processing device 100 identifies and acquires the acoustic information arriving from each partial region R21 in the sound collection region R20 for each partial region R21.

Further, the information processing device 100 associates the application manipulated by each user (for example, to which the voice input is performed) with the partial region R21 in the sound collection region R20 in accordance with the state or the context of the application. Then, the information processing device 100 allocates the acoustic information identified and acquired for each partial region R21 to the application associated with the partial region R21.

Note that, in the example described above, the information processing device 100 has been described in connection with a form in which the application is associated with the partial region R21 depending on whether or not the application is in the active state, but the information processing device 100 is not necessarily limited to this form. In other words, as long as the application is associated with any partial region R21 in accordance with the state or the context of the application, the operation of the information processing device 100 is not necessarily limited to the above form.

With the above configuration, the information processing device 100 can identify and acquire the voice input from each user and input each voice input acquired from each user to the application manipulated by the user even in the situation in which a plurality of users simultaneously perform manipulations. The overview of the control performed by the information processing device 100 according to the present embodiment has been described above with reference to FIGS. 4 to 7. Note that, the information processing device 100 according to the present embodiment will be described below in further detail.

1.3. Functional Configuration

Figure 8:
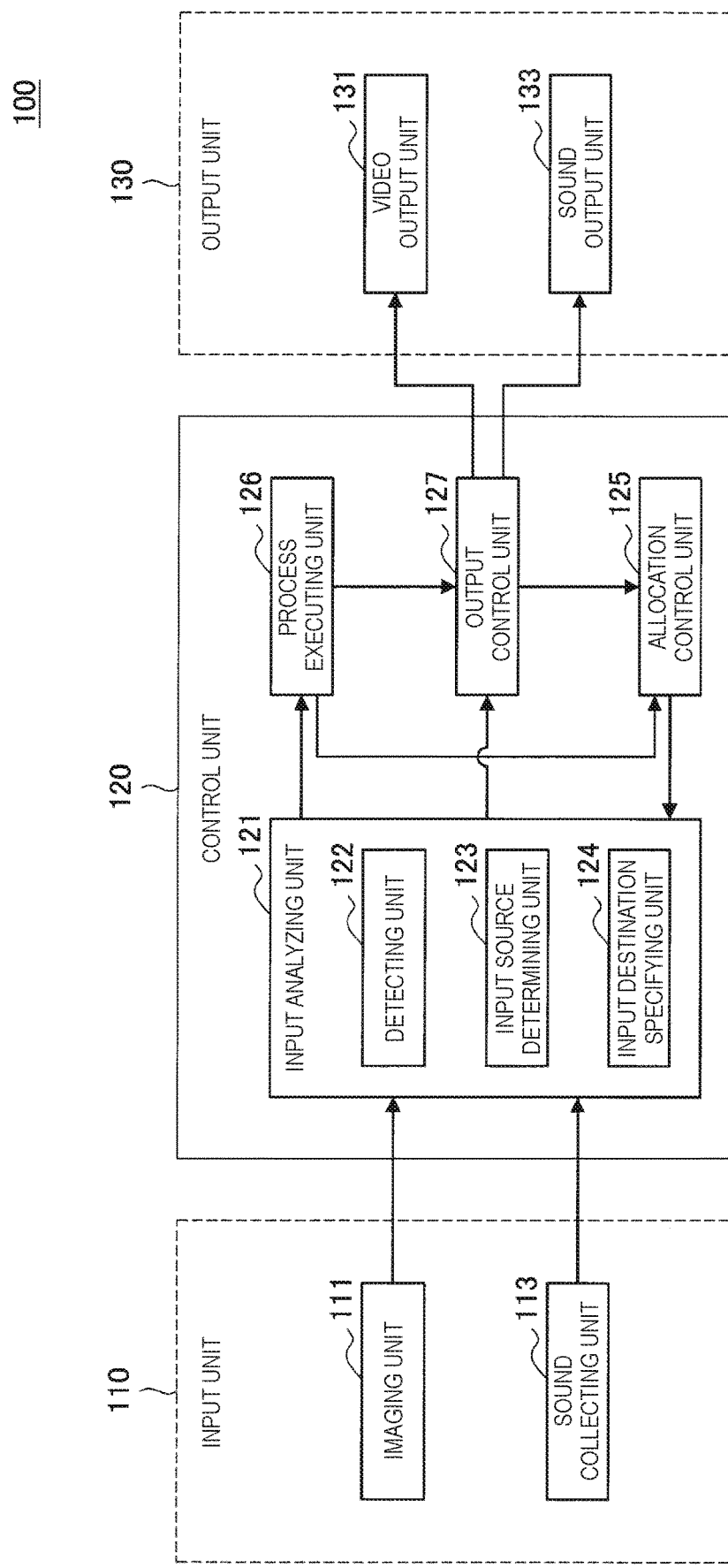
FIG. 8 is a block diagram illustrating an example of a functional configuration of the information processing device according to the embodiment.

First, an example of a functional configuration of the information processing device 100 according to the present embodiment will be described with reference to FIG. 8. FIG. 8 is a block diagram illustrating an example of a functional configuration of the information processing device 100 according to the present embodiment. Note that, this description will proceed with an example in which the information processing device 100 is configured as a projection type.

As illustrated in FIG. 8, the information processing device 100 according to the present embodiment includes an input unit 1.10, a control unit 120, and an output unit 130. The input unit 110 includes, for example, an imaging unit 111 and a sound collecting unit 113. In addition, the output unit 130 includes, for example, a video output unit 131. In addition, the output unit 130 may further include a sound output unit 133.

The input unit 110 is a component for acquiring content of manipulations performed by the user using the information processing device 100 on the information processing device 100 or information indicating a shape, a pattern, or the like of an object placed on a surface to which the output unit 130 outputs information (for example, the display surface R10 such as the top surface of the table 140a illustrated in FIG. 1). The content of manipulations performed by the user using the information processing device 100 on the information processing device 100 includes content of manipulations performed on a GUI which the information processing device 100 outputs to the information display surface.

For example, in a case in which the information processing device 100 is a projection type, the imaging unit 111 included in the input unit 110 acquires the content of manipulations performed by the user on the information processing device 100 or the information indicating a shape, a pattern, or the like of an object placed on the display surface R10, as image information. Specifically, the imaging unit 111 captures, for example, an image of the display surface R10 and outputs the captured image to a control unit 120 to be described later. Note that, the imaging unit 111 may be, for example, a camera including one imaging optical system, a stereo camera including two imaging optical systems, or the like.

The sound collecting unit 113 included in the input unit 110 is a component for collecting the acoustic information such as the voice spoken by the user using the information processing device 100 and an ambient sound of an environment in which the information processing device 100 is placed. As described above with reference to FIG. 5, the information processing device 100 according to the present embodiment identifies and acquires the acoustic information arriving from each of a plurality of partial regions R21 of the sound collection region R20 (in other words, the acoustic information arriving in a plurality of directions). Therefore, for example, the input unit 110 may include a plurality of sound collecting units 113, and a plurality of sound collecting units 113 may be configured as the array microphone. Note that, the following description will proceed with an example in which the input unit 110 includes a plurality of sound collecting units 113, and a plurality of sound collecting units 113 are configured as the array microphone.

Each of a plurality of sound collecting units 113 constituting the array microphone outputs the collected acoustic information to the control unit 120 to be described later.

The control unit 120 controls the respective components of the information processing device 100. For example, the control unit 120 generates information to be output from the output unit 130 by using information input by the input unit 110. As illustrated in FIG. 8, the control unit 120 includes an input analyzing unit 121, an allocation control unit 125, a process executing unit 126, and an output control unit 127.

The input analyzing unit 121 is a component for acquiring input information from the input unit 110 and analyzing the input information so that the process executing unit 126 or the output control unit 127 to be described later is operated. As illustrated in FIG. 8, the input analyzing unit 121 includes, for example, a detecting unit 122, an input source determining unit 123, and an input destination specifying unit 124.

The detecting unit 122 executes a process of detecting the content of manipulations performed by the user using the information processing device 100 on the information processing device 100, content of information output by the output unit 130, and a shape, a pattern, or the like of an object placed on the display surface R10 (for example, the table 140a illustrated in FIG. 1) to which the output unit 130 outputs information.

For example, in the case in which the information processing device 100 is the projection type illustrated in FIG. 1, the detecting unit 122 acquires the image of the display surface R10 captured by the imaging unit 111, analyzes the image, and detects the above-described manipulator, the object placed on the display surface R10, or the like. At this time, when coordinates of the display surface R10 for displaying information are calibrated to coincide with contact coordinates of the manipulator such as the hand of the user on the display surface R10 in advance, for example, the detecting unit 122 can detect a portion of the GUI touched by the manipulator.

Then, the detecting unit 122 outputs the detected content, for example, to the output control unit 127.

The input source determining unit 123 is a component for determining the input source of the input information acquired by the input unit 110. As a specific example, as described above with reference to FIG. 5, the input source determining unit 123 acquires the respective sound collection results of the acoustic information acquired by the plurality of sound collecting units 113 and estimates the partial region R21 in the sound collection region R20 in which the sound source of the acoustic information is positioned (in other words, the arrival direction of the acoustic information) in accordance with the acquired sound collection results. Note that, detailed description of the estimation method has been described above, and thus it is omitted in the present description.

The input source determining unit 123 outputs the sound collection results of the acoustic information collected by the plurality of sound collecting units 113 and the estimation result of the partial region R21 in which the sound source of the acoustic information is positioned, to the input destination specifying unit 124.

The input destination specifying unit 124 acquires the sound collection results of acoustic information collected by the plurality of sound collecting units 113 (for example, the voice spoken by the user) and the estimation result of the partial region R21 in which the sound source of the acoustic information is positioned, from the input source determining unit 123. Further, the input destination specifying unit 124 acquires information indicating each application that is in operation and the partial region R21 associated with the application from the allocation control unit 125 to be described later.

The input destination specifying unit 124 compares the estimation result of the partial region R21 in which the sound source of acoustic information is positioned with the information indicating the partial region R21 in which each application that is in operation is associated, and specifies an application associated with the partial region R21 in which the sound source of the acoustic information is positioned. Note that, at this time, in a case in which there are a plurality of applications serving as candidates, the input destination specifying unit 124 may specify the application serving as the target on the basis of priorities of respective applications which are set in advance. Note that, an operation performed in a case in which there are a plurality of applications serving as candidates will be separately described later in detail as a modified example.

Then, the input destination specifying unit 124 outputs the acquired sound collection result of the acoustic information to the process executing unit 126, and notifies the process executing unit 126 of the information indicating the specified application as the input destination of the acoustic information. As a result, the process executing unit 126 can recognize the application serving as the input destination of the acquired acoustic information even in the situation in which a plurality of applications are operated at the same time.

The process executing unit 126 is a component for executing various kinds of processes of applications or the like. The process executing unit 126 extracts a corresponding application from a predetermined storage unit (not illustrated), for example, on the basis of an instruction given from the user via the input unit 110, and executes the extracted application. Further, the process executing unit 126 may acquire input information from the input analyzing unit 121 and input the acquired input information to the application designated by the input analyzing unit 121. Further, the process executing unit 126 outputs execution results of various kinds of executed applications to the output control unit 127. Further, the process executing unit 126 may notify the allocation control unit 125 to be described later of information of various kinds of applications that are in execution (for example, types of applications or the like).

The output control unit 127 generates output information to be output from the output unit 130 on the basis of an analysis result for the input information acquired by the input analyzing unit 121, and causes the output unit 130 to output the output information.

As a specific example, the output control unit 127 acquires control information indicating the detected manipulation content of the user from the input analyzing unit 121. On the basis of the acquired control information, the output control unit 127 recognizes a manipulation target (for example, display object) designated on the basis of the user input and processing content on the manipulation target. Then, the output control unit 127 specifies the display object serving as a display control target in accordance with the specified manipulation target and the processing content, decides to display or not to display the specified display object, and controls a display position or direction and a display form (for example, a color or a size).

Further, the output control unit 127 may acquire the execution result of the application from the process executing unit 126 and perform generation of the output information or control related to an output of the output information on the basis of the execution result.

As a specific example, the output control unit 127 may acquire an execution result of an application from the process executing unit 126 and present a display result to a display object (for example, a window) associated with the application.

Further, the output information that the output control unit 127 causes the output unit 130 to output is not limited to the display information such as the display object. As a specific example, the output control unit 127 may cause the output unit 130 to output the acoustic information (for example, a sound) as the output information.

Further, the output control unit 127 may manage various kinds of states of the application on the basis of a result of display control of each display object or execution results of various kinds of applications (or content). Note that, examples of the states of the application include an active state and an inactive state. Examples of information for recognizing whether or not the application is in the active state include information indicating whether or not a corresponding display object is selected, information indicating whether or not an application (or content) in execution, and information indicating whether or not an application (or a corresponding display object) is receiving an input.

Then, the output control unit 127 notifies the allocation control unit 125 of states of various kinds of applications and a control result of the output information corresponding to the application (for example, the display object).

The allocation control unit 125 is a component for controlling an association between the partial regions included in the region (for example, the sound collection region R20 illustrated in FIG. 5) in which the input unit 110 acquires the input information and various kinds of applications.

Specifically, the allocation control unit 125 acquires the information indicating the state or the context of various kinds of applications that are in operation from the process executing unit 126 or the output control unit 127, and specifies the size or the position of the partial region to be associated with the application in accordance with the acquisition result.

As a specific example, as described above with reference to FIGS. 6 and 7, the allocation control unit 125 may specify the partial region R21 associated with the application on the basis of the information such as the position, the direction, the size, or the like of the display object corresponding to the application that is in operation. In this case, the allocation control unit 125 may acquire information of the display object corresponding to various kinds of applications from the output control unit 127 and specify the partial region R21 to be associated with the application in accordance with the acquired information.

Further, the allocation control unit 125 may recognize a relation between the sound collection region R20 in which each sound collection unit 113 can collect the acoustic information and the display surface R10 on which the output unit 130 displays the display information such as the display object, on the basis of a position relation between the respective sound collecting units 113 and the output unit 130 (particularly, the video output unit 131 to be described later), for example.

In addition, as another example, the allocation control unit 125 may specify the partial region R21 to be associated with the application in accordance with types of various kinds of applications. In this case, the allocation control unit 125 may acquire information indicating types of various kinds of applications from the process executing unit 126 and specify the partial region R21 to be associated with the application in accordance with the acquired information.

Further, the allocation control unit 125 may specify the application to be associated with the partial region R21 in accordance with the state of each application that is in operation. As a specific example, the allocation control unit 125 may associate the application transitioning to the active state among the applications that are in operation, with any of the partial regions R21. In this case, the allocation control unit 125 may determine whether or not each application is in the active state (or whether or not each application has transitioned to the active state) on the basis of the information acquired from the process executing unit 126 or the output control unit 127.

Note that, the allocation control unit 125 may associate the management software operating at the OS level such as the sound agent or the like with the partial region R21 other than the partial region R21 associated with the application among the partial regions R21.

Further, the allocation control unit 125 may perform control such that the association between the application and the partial region R21 is canceled in accordance with the context or the state of the application associated with the partial region R21. As a specific example, the allocation control unit 125 may cancel the association between the application and the partial region R21 in a case in which the application associated with the partial region R21 transitions from the active state to the inactive state.

It will be appreciated that the allocation control unit 125 is allowed to cancel the association between the application and the partial region R21 in a case in which the application associated with the partial region R21 ends.

Note that, in a case in which the association between the application and the partial region R21 is canceled and the application is not associated with the partial region R21 accordingly, the allocation control unit 125 may associate the management software operating at the OS level with the partial region R21.

Note that, a timing at which the allocation control unit 125 executes the above-described process is not particularly limited. As a specific example, the allocation control unit 125 may periodically monitor the state or the context of various kinds of applications and execute control related to the association between the application and the partial region R21 in accordance with a monitoring result.

In addition, as another example, the allocation control unit 125 may execute control related to the association between the application and the partial region R21 by using a specific process as a trigger. As a concrete example, in a case in which the state of the application transitions to the active state or the inactive state, the allocation control unit 125 may execute the control related to the association between the application and the partial region R21 by using the transition of the state as a trigger.

The output unit 130 outputs information in accordance with the manipulation content of the user using the information processing device 100, content of the information output by the output unit 130, and information such as the shape, the pattern or the like of the object placed on the display surface R10 to which the output unit 130 outputs information (for example, the table 140a illustrated in FIG. 1), which are input via the input unit 110. The output unit 130 outputs information on the basis of information generated by the output control unit 127.

The video output unit 131 included in the output unit 130 is a component for outputting display information such as a screen (GUI) on which the display object is presented. In a case in which the information processing device 100 is configured as the projection type, the video output unit 131 may be, for example, a projector for projecting the display information onto a desired projection plane (that is, display surface R10).

In addition, the sound output unit 133 included in the output unit 130 is a component for outputting the acoustic information such as a sound effect, music, or a voice as the output information. The sound output unit 133 may be, for example, an acoustic device such as a speaker.

The example of the functional configuration of the information processing device 100 according to the present embodiment has been described above with reference to FIG. 8.

1.4. Process

Figure 9:
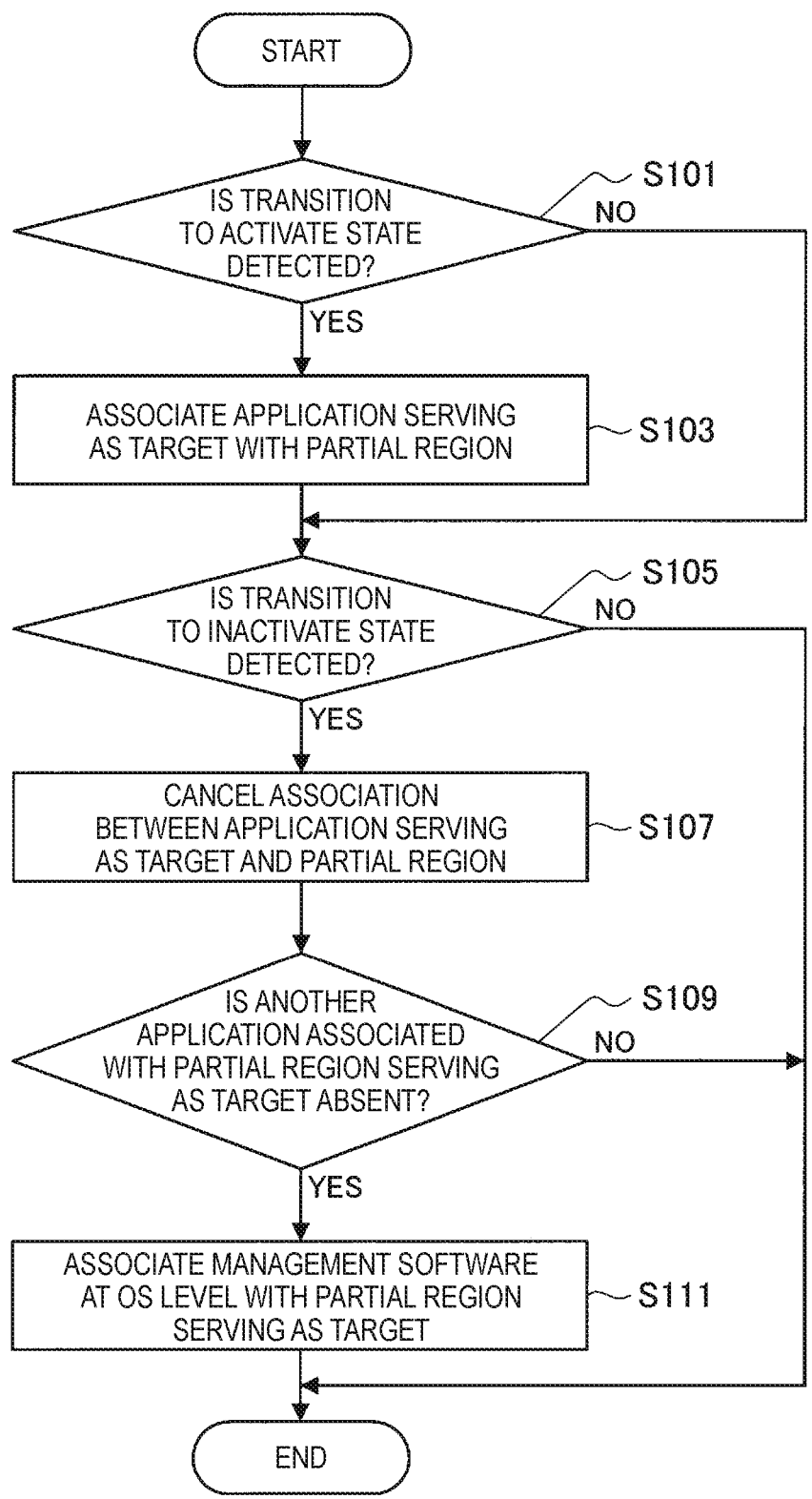
FIG. 9 is a flowchart illustrating an example of a flow of a series of processes of the information processing device according to the embodiment.
Figure 10:
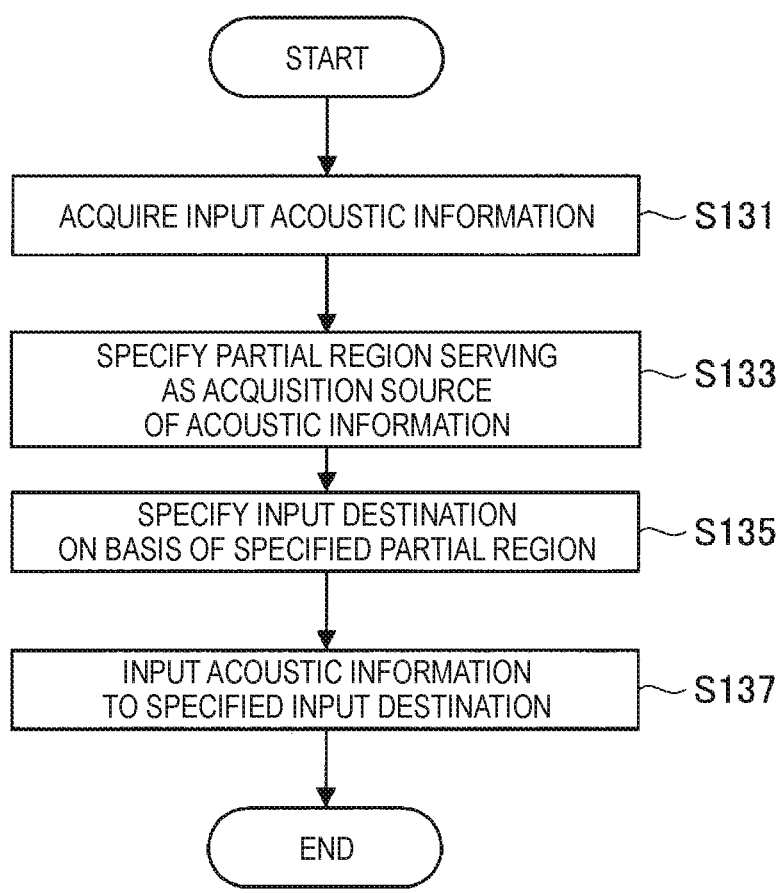
FIG. 10 is a flowchart illustrating an example of a flow of a series of processes of the information processing device according to the embodiment.

Next, an example of a flow of a series of processes of the information processing device 100 according to the present embodiment will be described with reference to FIG. 9 and FIG. 10. FIGS. 9 and 10 are flowcharts illustrating an example of a flow of a series of processes of the information processing device 100 according to the present embodiment.

First, an example of a process related to control of the association between application and partial region R21 performed by the information processing device 100 according to the present embodiment will be described below with reference to FIG. 9. Note that, the present description will proceed with an example in which the information processing device 100 controls the association between the application and the partial region R21 in accordance with whether or not the application is in the active state.

(Step S101)

The allocation control unit 125 of the information processing device 100 acquires the information indicating the state or the context of various kinds of applications that are in operation from the process executing unit 126 or the output control unit 127, and detects the application that has transitioned to the active state on the basis of the acquisition result.

(Step S103)

In a case in which the application that has transitioned to the active state is detected (YES in step S101), the allocation control unit 125 specifies the partial region R21 to be associated with the application on the basis of the acquired information of the application. As a specific example, the allocation control unit 125 estimates the position of the user who manipulates the application on the basis of the position, the direction, the size, or the like of the display object corresponding to the application that has transitioned to the active state and specifies the partial region R21 in which the user is positioned.

Then, the allocation control unit 125 associates the application that has transitioned to the active state with the specified partial region R21. Note that, the allocation control unit 125 may notify the input destination specifying unit 124 in the input analyzing unit 121, of the information indicating the associations between various kinds of applications and the partial regions R21. As a result, the input destination specifying unit 124 can recognize the application associated with each partial region R21.

Note that, in a case in which the application that has transitioned to the active state is not detected (NO in step S101), the allocation control unit 125 does not execute a process illustrated as step S103 but proceeds to a next process.

(Step S105)

In addition, on the basis of the information indicating the state or the context of various kinds of applications acquired from the process executing unit 126 or the output control unit 127, the allocation control unit 125 detects an application that has transitioned to the inactive state among the applications associated with the partial regions R21. Note that, in a case in which the application that has transitioned to the inactive state is not detected (NO in step S105), the allocation control unit 125 does not execute the process related to steps S107 to S111 to be described later and proceeds to a next process.

(Step S107)

In a case in which the application that has transitioned to the inactive state is detected (YES in step S101), the allocation control unit 125 cancels the association between the detected application and the partial region R21 associated with the application.

(Step S109)

In a case in which the association between the application and the partial region R21 is canceled, the allocation control unit 125 checks whether or not another application is associated with the partial region R21.

(Step S111)

In a case in which no other application is associated with the partial region R21 serving as the target (YES in step S109), the allocation control unit 125 may associate the management software operating at the OS level with the partial region R21. As the management software operating at the OS level, for example, the sound agent may be used.

Note that, in a case in which another application is associated with the partial region R21 serving as the target (NO in step S109), the allocation control unit 125 does not execute the process illustrated as step S111 but proceeds to a next process.

As described above, the information processing device 100 controls the association between the application and the partial region R21 in accordance with the state or the context of various kinds of applications.

Note that, a timing at which the information processing device 100 executes the above-described series of processes is not particularly limited. As a specific example, the information processing device 100 may periodically monitor the state or the context of various kinds of applications and execute control related to the association between the application and the partial region R21 in accordance with a monitoring result.

In addition, as another example, the information processing device 100 may execute control related to the association between the application and the partial region R21 by using a specific process as a trigger. As a concrete example, in a case in which the state of the application transitions to the active state or the inactive state, the information processing device 100 may execute the control related to the association between the application and the partial region R21 by using the transition of the state as a trigger.

Further, in the above example, the process related to steps S101 to S111 has been described as the flow of a series of processes. On the other hand, the process (steps S101 to S103) in the case of detecting the application that has transitioned to the active state and the process (step S105 to S111) in the case of detecting the application that has transitioned to the inactive state are performed separately at different timings.

The example of the process related to the control of the association between application and partial region R21 performed by the information processing device 100 according to the present embodiment has been described above with reference to FIG. 9.

Next, an example of a process in which the information processing device 100 according to the present embodiment specifies an application serving as an input destination of the acoustic information acquired as an input and inputs the acoustic information to the specified application will be described with reference to FIG. 10.

(Step S131)

The input analyzing unit 121 of the information processing device 100 acquires the sound collection results of the acoustic information such as the voices spoken by the users or the ambient sound of the environment in which the information processing device 100 is placed from each of a plurality of sound collecting units 113 included in the array microphone.

(Step S133)

As described above with reference to FIG. 5, the input source determining unit 123 of the input analyzing unit 121 estimates the partial region R21 in the sound collection region R20 in which the sound source of the acoustic information is positioned in accordance with the acquired sound collection result ((in other words, the arrival direction of the acoustic information). As a specific example, the input analyzing unit 121 estimates the partial region R21 in the sound collection region R20 in which the sound source of the acoustic information is positioned in accordance with the ratio of the volumes of the acoustic information collected by a plurality of sound collecting units 113 included in the array microphone.

Subsequently, the input source determining unit 123 outputs the sound collection results of the acoustic information collected by the plurality of sound collecting units 113 and the estimation result of the partial region R21 in which the sound source of the acoustic information is positioned, to the input destination specifying unit 124.

(Step S135)

The input destination specifying unit 124 acquires the sound collection results of acoustic information collected by the plurality of sound collecting units 113 (for example, the voice spoken by the user) and the estimation result of the partial region R21 in which the sound source of the acoustic information is positioned, from the input source determining unit 123. Further, the input destination specifying unit 124 acquires information indicating each application that is in operation and the partial region R21 associated with the application from the allocation control unit 125.

The input destination specifying unit 124 compares the estimation result of the partial region R21 in which the sound source of acoustic information is positioned with the information indicating the partial region R21 in which each application that is in operation is associated, and specifies an application associated with the partial region R21 in which the sound source of the acoustic information is positioned. In other words, the input destination specifying unit 124 specifies the application associated with the partial region R21 in which the sound source of the acoustic information is positioned as the input destination of the acquired acoustic information.

(Step S137)

Then, the input destination specifying unit 124 outputs the acquired sound collection result of the acoustic information to the process executing unit 126, and notifies the process executing unit 126 of the information indicating the specified application as the input destination of the acoustic information. As a result, the process executing unit 126 can recognize the application serving as the input destination of the acquired acoustic information even in the situation in which a plurality of applications are operated at the same time.

The example of a process in which the information processing device 100 according to the present embodiment specifies an application serving as an input destination of the acoustic information acquired as an input and inputs the acoustic information to the specified application has been described with reference to FIG. 10.

1.5. Modified Examples

Next, modified examples of the information processing device 100 according to the present embodiment will be described.

Figure 11:
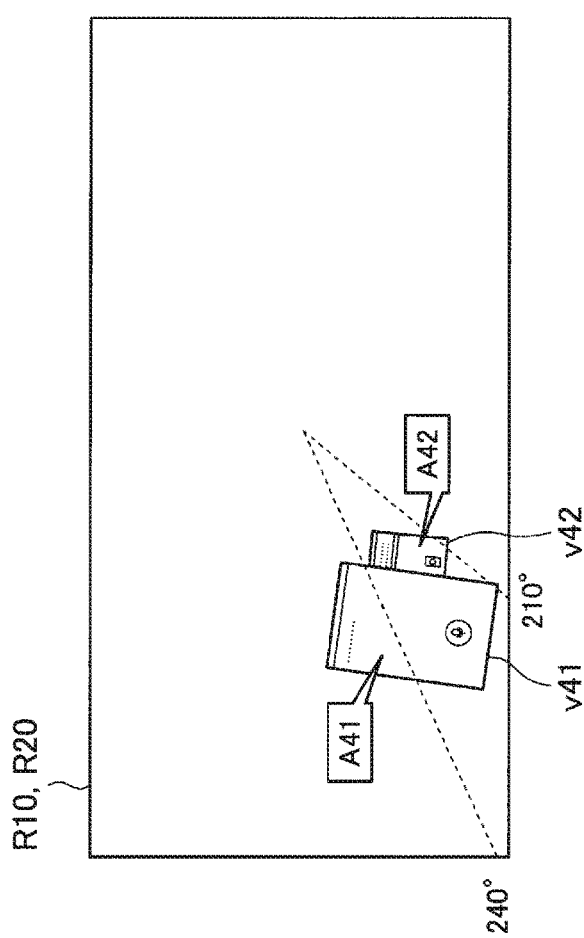
FIG. 11 is an explanatory diagram for describing an example of control of an information processing device according to a first modified example.
Figure 12:
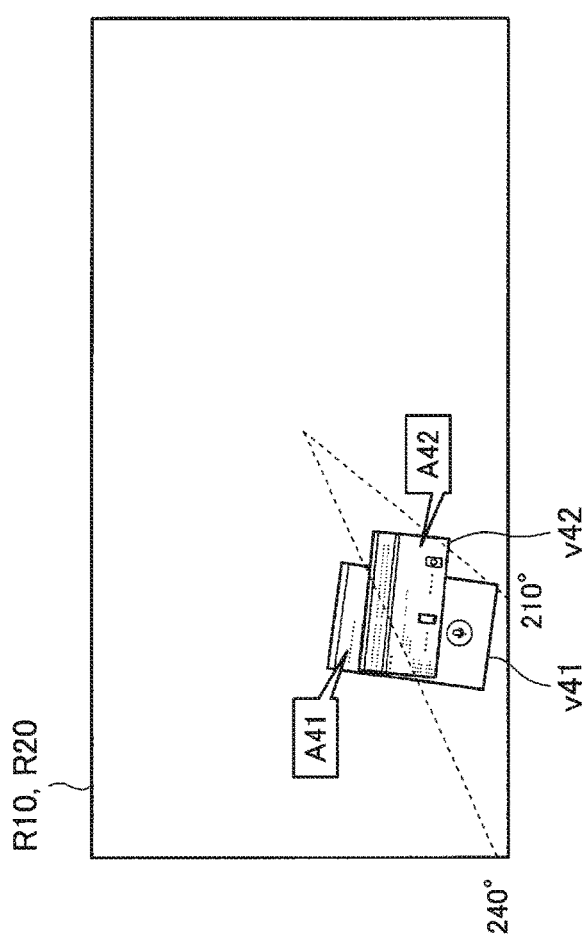
FIG. 12 is an explanatory diagram for describing an example of control of an information processing device according to a first modified example.
Figure 13:
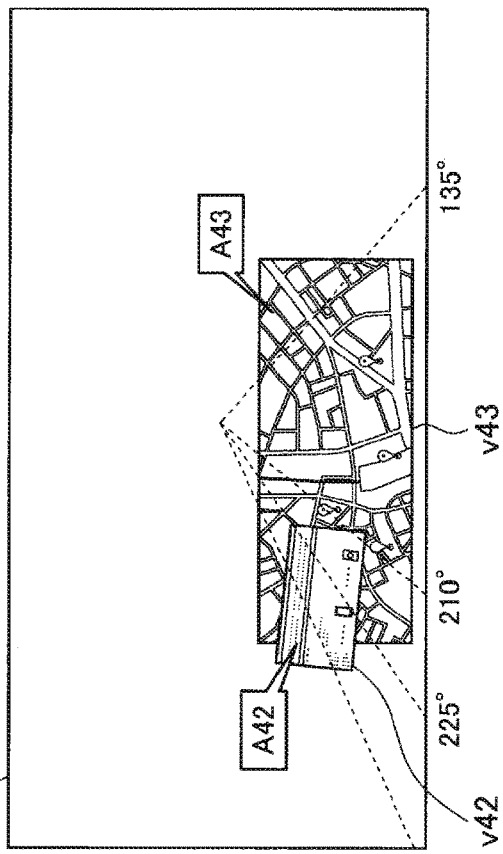
FIG. 13 is an explanatory diagram for describing an example of control of an information processing device according to a first modified example.

1.5.1. First Modified Example: First Control Example in a Case in which there are a Plurality of Input Destination Candidates First, an example of control of the information processing device 100 in a case in which there are a plurality of applications serving as candidates for the input destination of the acoustic information acquired as the input information (that is, a plurality of applications are associated with the specified partial region R21) will be described as a first modified example with reference to FIGS. 11 to 13. FIGS. 11 to 13 are explanatory diagrams for describing an example of control of the information processing device 100 according to the first modified example.

Note that, in the first modified example, an example of control in which the information processing device 100 inputs the acquired acoustic information only to one of a plurality of candidate applications (hereinafter also referred to as "exclusive control") will be described. In addition, the present description will proceed with an example in which the information processing device 100 associates the application with the partial region on the basis of the information such as the position, the direction, or the size of the display object of the application serving as the target.

For example, FIG. 11 illustrates an example in which a voice search application A41 and a web browser A42 (also referred to simply as an "application A42") are associated with a common partial region. In a left diagram of FIG. 11, reference numeral v41 indicates a display object (for example, a manipulation screen) corresponding to the application A41. Similarly, reference numeral v42 indicates a display object corresponding to the web browser A42.

Further, in the example illustrated in the left drawing of FIG. 11, the partial region in the sound collection region R20 is set in accordance with a direction based on a predetermined reference position (for example, the position of the input unit 110). As a specific example, in the example illustrated in the left drawing of FIG. 11, the application A41 and the application A42 are associated with a partial region formed between a 210° direction and a 240° direction in a case in which a predetermined direction based on the reference position (for example, an upper direction in FIG. 11) is 0°. Note that, as illustrated in FIG. 11, for example, the partial region formed between the 210° direction and the 240° direction is also referred to as a "partial region 210-240."

Further, a right diagram of FIG. 11 illustrates an example of a relation of each application (program), a partial region associated with the application, a priority of each application, and a mode set in each application. Here, the mode set in each application indicates whether or not the exclusive control is performed on the input of the acoustic information, and in the example illustrated in FIG. 11, the "Exclusive (exclusive control)" is set in both the applications A41 and A42. Note that, an example of control performed in a case in which the information processing device 100 does not perform the exclusive control among a plurality of applications when the acoustic information is input will be separately described later as a second modified example.

For example, in the example illustrated in FIG. 11, the information processing device 100 sets priorities such that a high priority is assigned to an application of which a corresponding display object is displayed in a higher layer among a plurality of applications associated with the common partial region. As a concrete example, in the example illustrated in FIG. 11, the display object v41 is displayed in a layer (for example, a forefront layer) higher than the display object v42. Therefore, the information processing device 100 sets the priority of the voice search application A41 to be higher than the priority of the web browser A42.

Here, the Exclusive (exclusive control) is set as mode in both the application A41 and A42. Therefore, in the example illustrated in FIG. 11, the information processing device 100 inputs the acoustic information acquired from the partial region 210-240 to the voice search application A41 with a higher priority among the applications A 41 and A42 associated with the partial region 210-240.

Next, an example illustrated in FIG. 12 will be described. FIG. 12 illustrates an example in which the display object v42 corresponding to the web browser A42 is selected by the user in the state illustrated in FIG. 11, and the display object v42 is displayed on the forefront.

In this case, the information processing device 100 updates the priorities set in the applications so that the priority of the web browser A42 whose display object is displayed on the higher layer becomes higher than the priority of the application A41.

In addition, in the example illustrated in FIG. 12, the information processing device 100 inputs the acoustic information acquired from the partial region 210-240 to the web browser A42 having a higher priority among the applications A41 and A42 associated with the partial region 210-240.

Next, an example illustrated in FIG. 13 will be described. The example illustrated in FIG. 13 illustrates an example in which a plurality of applications are associated with different partial regions, and the partial regions partially overlap.

Specifically, in the example illustrated in FIG. 13, the web browser A42 is associated with a partial region 210-240 formed between a 210° direction and a 240° direction in a case in which a predetermined direction based on a reference position (for example, an upper direction in FIG. 13) is 0°. On the other hand, the application A43 that presents a map is associated with a partial region 135-225 formed between a 135° direction and a 225° direction in a case in which the predetermined direction is 0°. Here, the partial regions 210-240 and the partial regions 135-225 overlaps in a region 210-225 formed between the 210° direction and the 225° direction.

Further, in a left diagram of FIG. 13, reference numeral A42 indicates a display object corresponding to the web browser A42. Similarly, reference numeral A43 indicates a display object corresponding to the application A43 presenting the map.

In addition, in the example illustrated in FIG. 13, similarly to the example illustrated in FIG. 11 and FIG. 12, the information processing device 100 is assumed to set priorities of the applications such that a high priority is assigned to an application in which a corresponding display object is displayed in a higher layer. Specifically, in the example illustrated in FIG. 13, the display object v42 is displayed in a layer (for example, a forefront layer) higher than the display object v43. Therefore, the information processing device 100 sets the priority of the web browser A42 to be higher than the priority of the application A43 presenting the map.

Further, the Exclusive (exclusive control) is assumed to be set in both the application A42 and A43 as a mode.

Under this situation, for example, the information processing device 100 is assumed to acquire the acoustic information from a region 225-240 not overlapping the partial region 135-225 in the partial region 210-240 associated with the web browser A42. Here, only the web browser A42 is associated with the region 225-240 included in the partial region 210-240. Therefore, the information processing device 100 inputs the acoustic information acquired from the region 225-240 into the web browser A42.

Similarly, the information processing device 100 is assumed to acquire the acoustic information from a region 135-210 not overlapping with the partial region 210-240 in the partial region 135-225 associated with the application A43 presenting the map. Here, only the application 443 presenting the map is associated with the region 135-210 included in the partial region 135-225. Therefore, the information processing device 100 inputs the acoustic information acquired from the region 135-210 to the application A43 presenting the map.

On the other hand, the web browser A42 and the application A43 presenting the map are associated with the region 210-225 in which the partial regions 135-225 and the partial regions 210-240 overlap. Here, as described above, the Exclusive (exclusive control) is set in both the application A42 and A43 as a mode. Therefore, in a case in which the acoustic information is acquired from the region 210-225, the information processing device 100 decides the input destination of the acoustic information on the basis of the priorities set in the applications A42 and A43.

Specifically, in the example illustrated in FIG. 13, the priority of the web browser A42 is set to be higher than the priority of the application A43 presenting the map. Therefore, in a case in which the acoustic information is acquired from the region 210-225, the information processing device 100 inputs the acoustic information to the web browser A42 on which the higher priority is set.

As described above, the example of the control of the information processing device 100 performed in the case in which there are a plurality of applications serving as the candidates for the input destination of the acoustic information acquired as the input information has been described with reference to FIGS. 11 to 13 as the first modified example. According to the configuration described above, the information processing device 100 is able to set the priorities of the applications even in the situation in which there are a plurality of applications serving as the candidates for the input destination of the acoustic information and able to decide the input destination of the acquired acoustic information on the basis of the priority.

Note that, in the example described above, the information processing device 100 sets the priorities of the applications associated with the common partial region in accordance with the position relation between the layers in which the corresponding display object is displayed. However, the above example is merely an example, and as long as the information processing device 100 can set the priorities of the applications associated with the common partial region, the method is not particularly limited.

As a specific example, in the case of the configuration (the table top type configuration) in which information is displayed on a horizontal plane such as the top surface of the table as illustrated in FIGS. 1 to 3, the user is positioned outside the outer edge of the display surface R10, and the display object displayed on the outer side of the display surface R10 will be positioned closer to the user. Using this feature, the information processing device 100 may assign the priority such that a higher priority is assigned to an application of which a corresponding display object is positioned on the outer side of the display surface R10 among the applications associated with the common partial region.

As another example, the information processing device 100 may set the priority of an application associated with the common partial region on the basis of the size of the partial region associated with each application. As a specific example, the information processing device 100 may assign the priority such that a priority of an application associated with a narrower partial region becomes higher than a priority of an application associated with a wider partial region.

Figure 14:
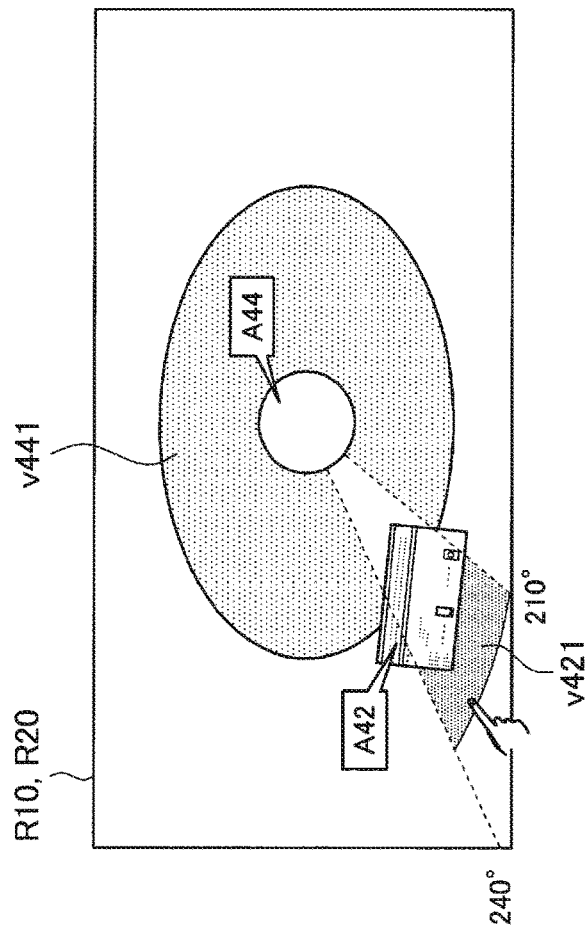
FIG. 14 is an explanatory diagram for describing an example of control of an information processing device according to a second modified example.
Figure 15:
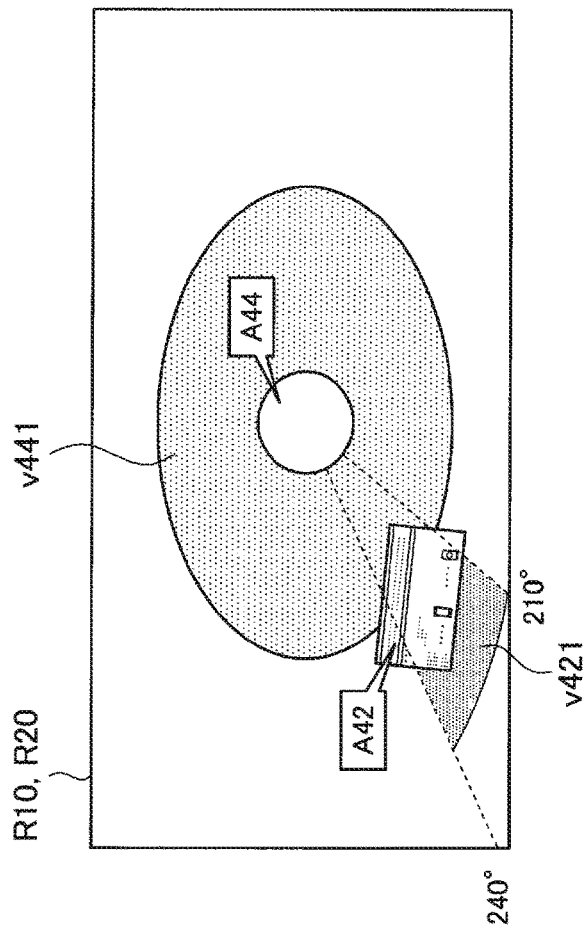
FIG. 15 is an explanatory diagram for describing an example of control of an information processing device according to a second modified example.

1.5.2. Second Modified Example: Second Control Example in a Case in which there are a Plurality of Input Destination Candidates Next, another example of the control of the information processing device 100 performed in a case in which there are a plurality of applications serving as the candidates for the input destination of the acoustic information acquired as the input information will be described as a second modified example with reference to FIGS. 14 and 15. FIGS. 14 and 15 are explanatory diagrams for describing an example of the control of the information processing device 100 according to the second modified example.

In the first modified example, the example of the control of the information processing device 100 performed in the cases in which the acoustic information is input only to one of the applications (that is, the exclusive control is performed) in the situation in which there are a plurality of applications serving as the candidates for the input destination of the acoustic information acquired as the input information has been described. In the second modified example, an example of control of the information processing device 100 performed in a case in which the acoustic information is input to each of the applications in a situation in which there are a plurality of applications serving as the candidates for the input destination will be described.

For example, FIG. 14 illustrates an example in which a web browser A42 is associated with a partial region 210-240, a conference call application A44 is associated with a partial region 0-360 (that is, the entire sound collection region R20). Here, as illustrated in a left diagram of FIG. 14, the Exclusive (exclusive control) is assumed to be set in both the application A42 and A44 as a mode. Further, as illustrated in the left drawing of FIG. 14, the priority of the web browser A42 is assumed to be set to be higher than the priority of the conference call application A44.

Here, in the example illustrated in FIG. 14, in a case in which a predetermined direction based on a reference position is 0°, only the conference call application A44 is associated with the partial regions 240-210 formed from a 240° direction to a 210° direction clockwise (that is, a partial region 210-360 and a partial region 0-240). Therefore, the information processing device 100 inputs the acoustic information acquired from the partial region 240-210 to the conference call application A44.

On the other hand, the applications A42 and A44 are associated with the partial regions 210 to 240 formed from the 210° direction to the 240° direction clockwise, and the Exclusive (exclusive control) is set in both the applications A42 and A44 as a mode. Therefore, as described above in the first modified example, the information processing device 100 performs the exclusive control on the input of the acoustic information between the application A42 and A44. In other words, in the example illustrated in FIG. 14, the information processing device 100 inputs the acoustic information acquired from the partial region 210-240 only to the web browser A42 in which the higher priority is set.

Here, for example, the information processing device 100 may perform control such that the acoustic information acquired from the partial region 210-240 is input to the conference call application A44 in addition to the web browser A42 on the basis of an instruction given from the user. For example, FIG. 15 illustrates an example of control performed in a case in which the information processing device 100 inputs the acoustic information acquired from the partial region 210-240 to the conference call application A44 in addition to the web browser A42.

Specifically, the information processing device 100 receives a manipulation performed by the user on the partial region 210-240, and changes the mode of the application associated with the partial region 210-240 from "Exclusive" to "Through" in which the input information is shared by the applications. For example, in the example illustrated in FIG. 15, the information processing device 100 changes the mode of the web browser A42 to "Through."

Note that, at this time, for example, as illustrated in FIGS. 14 and 15, the information processing device 100 may present a display object v421 indicating a reception state of the input information (sound) to the web browser A42 (for example, a fan-like display object of presenting the partial region 210-240) to the user, receive a predetermined user manipulation related to a mode change (for example, a touch manipulation) performed on the display object v421, and change the mode of the web browser A42. The same applies to the conference call application A44. In other words, the information processing device 100 may present a display object v441 indicating a reception state of the input information (sound) to the application A44 to the user, receive the user manipulation (for example, the touch manipulation) performed on the display object v441, and change the mode of the application A44.

In addition, as another example, the information processing device 100 may receive a predetermined manipulation related to the mode change performed on the display object corresponding to each application from the user and change the mode of the application corresponding to the display object.

Further, the information processing device 100 may control the mode setting in units of partial regions. As a specific example, the information processing device 100 may be able to change the mode in only some regions (for example, the region 210-220) in the partial region 210-240 with associated the web browser A42, in this case, the information processing device 100 may be able to receive designation of the partial region issued by the user and a predetermined manipulation related to the mode change performed on the partial region and change the mode set in the partial region.

On the basis of such mode control, the information processing device 100 inputs the input information (for example, the acoustic information) to be input to the application to which "Through" is set to other applications with the lower priority than the application. As a concrete example, in the example illustrated in FIG. 15, the information processing device 100 inputs the acoustic information acquired from the partial region 210-240 to the web browser A42 on which a higher priority is set. Further, since "Through" is set as the mode of the web browser A42, the information processing device 100 also inputs the acoustic information to the conference call application A44 having the lower priority than the web browser A42.

As described above, the example of the control of the information processing device 100 in which the acoustic information is input to each application in the situation in which there are a plurality of applications serving as the candidates for the input destination has been described as the second modified example with reference to FIGS. 14 and 15. According to the configuration described above, the information processing device 100 can input the acoustic information to each application on the basis of the control of the mode set in each application serving as the candidate for the input destination. In other words, by using the information processing device 100 of the second modified example, the user can appropriately cancel the exclusive control between the applications associated with a desired partial region and input input information (for example, the acoustic information such as the voice) to each application.

1.5.3. Third Modified Example: Notification of Information Indicating Each Region Next, an example of a method of notifying the user of the partial region R21 in which each application is associated through the information processing device 100 will be described as a third modified example.

As a specific example, the information processing device 100 may cause a display object for visualizing each partial region associated with the application to be presented on the display surface R10. As a specific example, as illustrated in FIGS. 14 and 15, the information processing device 100 causes each partial region associated with the application to be presented on the display surface R10 as the fan-like display object (for example, the display objects v421 and v441).

Figure 16:
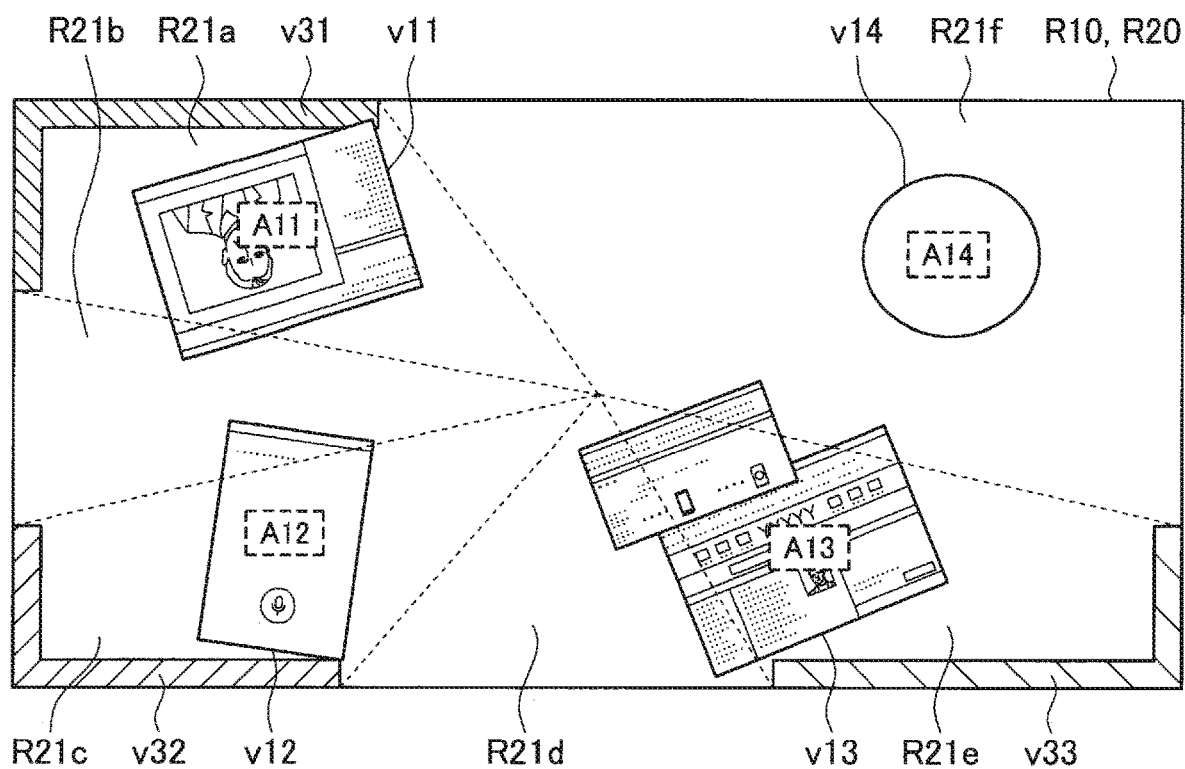
FIG. 16 is an explanatory diagram for describing an overview of an information processing device according to a third modified example.

In addition, FIG. 16 is an explanatory diagram for describing an overview of the information processing device 100 according to a third modified example and illustrates an example of a display form of a display object for visualizing each partial region.

In the example illustrated in FIG. 16, applications A11, A12, and A13 are associated with partial regions R21*a*, R21*c*, and R21*e* among partial regions R21*a* to R21*f* in the sound collection region R20. Further, the management software (for example, sound agent) operating at the OS level is associated with the partial regions R21*b*, R21*d*, and R21*f*.

In FIG. 16, reference numeral v31 is a display object indicating the partial region R21*a*. In addition, reference numeral v31 is a display object indicating the partial region R21*c*. Similarly, reference numeral v33 is a display object indicating the partial region R21*e*.

In other words, in the example illustrated in FIG. 16, the information processing device 100 causes the display objects v31 to v33 indicating the respective partial regions to be displayed in portions which the partial regions R21*a*, R21*c*, and R21*e* overlap in an outer edge portion of the display surface R10.

Further, as illustrated in FIG. 16, the information processing device 100 causes the display object indicating the partial region to be displayed on the display surface R10 with respect to the partial region associated with an application other than the management software operating at the OS level (for example, an application in the active state) among the partial regions. As described above, the information processing device 100 may present the user with the display object indicating the partial region with respect to a partial region satisfying a specific condition (for example, a partial region associated with an application in the active state) only.

Further, the information processing device 100 may present the user with information so that a relation between each partial region and the application associated with the partial region can be identified. Specifically, with respect to a certain partial region, the information processing device 100 may display identification information common to the display object indicating the partial region and the display object corresponding to the application associated with the partial region.

For example, the information processing device 100 may assign, to a display object corresponding to an application associated with a partial region, a marker of the same color as the display object indicating the partial region as the identification information. Accordingly, the user can easily recognize that the partial region and the display object (that is, the application) that are presented in the same color are associated with each other.

Note that, the example in which the information processing device 100 presents each partial region associated with the application as the display information has been described above. However, the above example is merely an example, and the method is not particularly limited as long as the information processing device 100 can present each partial region associated with the application to the user. As a specific example, the information processing device 100 may present each partial region to the user by causing a light emitting unit such as an LED (light-emitting diodes) to emit light.

As described above, the example of the method of notifying the user of the partial region R21 associated with each application through the information processing device 100 has been described as the third modified example with reference to FIGS. 14 to 16.

1.5.4. Fourth Modified Example: Output Amount Control Example

Figure 17:
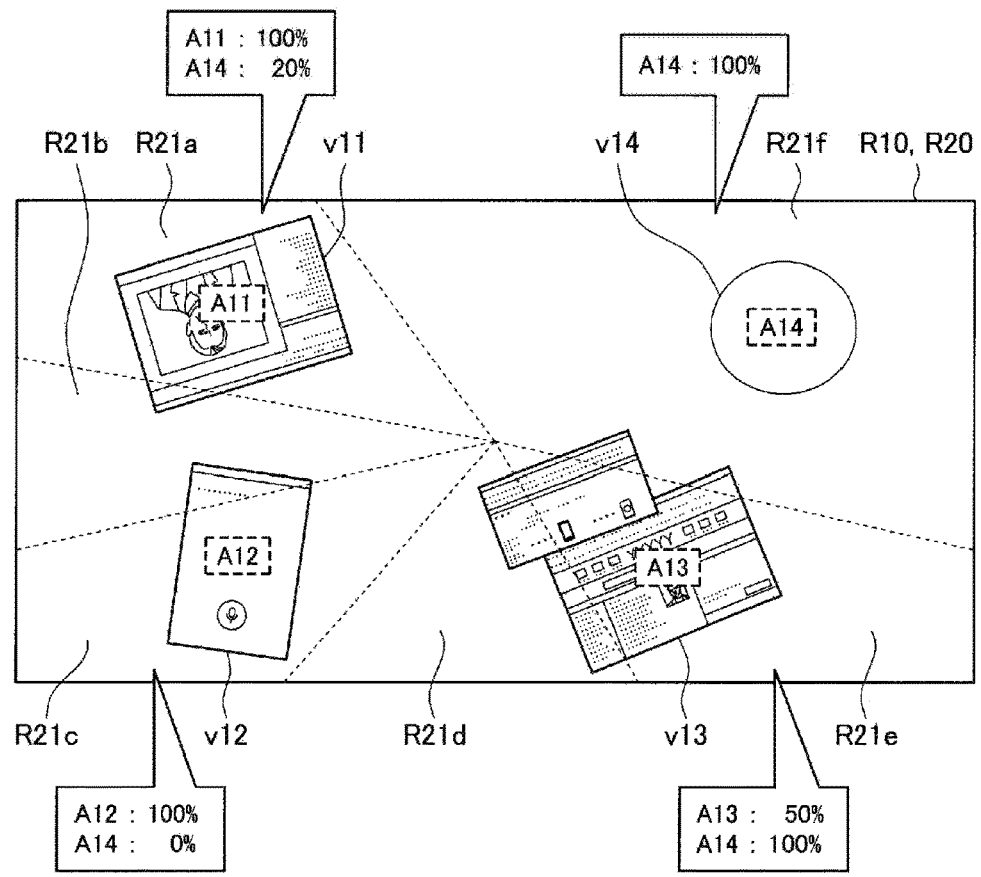
FIG. 17 is an explanatory diagram for describing an overview of an information processing device according to a fourth modified example.

The embodiment and the modified examples described above have been described in connection with the example in which the information processing device 100 controls the input destination of the acquired input information for each partial region. A fourth modified example will be described in connection with an example in which the information processing device 100 controls an output amount (for example, a volume) of the output information output from each application for each partial region. For example, FIG. 17 is an explanatory diagram for describing an overview of the information processing device 100 according to the fourth modified example and illustrates an example in which the information processing device 100 controls the output amount of the acoustic information output from each application, for each partial region.

For example, when a directional speaker is applied as an output device for outputting the acoustic information (that is, an output device corresponding to the sound output unit 133), the information processing device 100 can control the output of the acoustic information for each partial region.

Specifically, a plurality of directional speakers are disposed for the information processing, device 100, and each directional speaker is associated with one of the partial regions R21 in the sound collection region R20. Then, the position or the direction of each directional speaker is adjusted in advance so that an output destination of the acoustic information of each directional speaker (that is, a direction in which the acoustic information is output) becomes the partial region associated with the directional speaker. With this configuration, the information processing device 100 can individually control the output of the acoustic information for each partial region individually by controlling the output of the acoustic information for each directional speaker.

Here, the situation illustrated in FIG. 17 will be described in detail. For example, in the example illustrated in FIG. 17, applications A11, A12, and A13 which is receiving a manipulation from specific users (that is, in the active state) are associated with partial regions R21a, R21c, and R21e among partial regions R21a to R21f in the sound collection region R20. Further, the management software (for example, sound agent) operating at the OS level is associated with the partial regions R21b, R21d, and R21f. Note that, in the example illustrated in FIG. 17, the music player application indicated by reference numeral A14 is in a state in which the manipulation of the specific user is not received (that is, the inactive state) and operates on the basis of management of the management software operating at the OS level.

Under this situation, for example, the information processing device 100 sets the output amount of the acoustic information output from the application A14 in the inactive state to 100% for the partial regions R21b, R21d, and R21f associated with the management software operating at the OS level. Further, the information processing device 100 does not output (or suppresses the output of) the acoustic information output from the other applications A11 to A13 for the partial regions R21b, R21d, and R21f. In other words, the users positioned in the partial regions R21b, R21d, and R21f only recognizes the acoustic information output from the music player application A14.

On the other hand, attention is paid to the partial region R21a associated with the application A11 in the active state. The information processing device 100 sets the output amount of the acoustic information output from the application A11 to 100% for the partial region R21a. Further, the information processing device 100 suppress the output of the acoustic information so that the output amount of the acoustic information output from the application A14 operating on the basis of the management of the management software (that is, in the inactive state) is 20% for the partial region R21a. In other words, the user positioned in the partial region R21a recognizes the acoustic information output from the application A11 and the application A14. In addition, at this time, the volume of the acoustic information output from the application A11 is larger than the volume of the acoustic information output from the application A14.

In addition, as another example, attention is paid to the partial region R21c associated with the application A12 in the active state. The information processing device 100 sets the output amount of the acoustic information output from the application A12 to 100% for partial region R21c. Further, the information processing device 100 suppress the output of the acoustic information so that acoustic information is not output from the application A14 operating on the basis of the management of the management software (that is, the output becomes 0%) for the partial region R21c. In other words, the user positioned in the partial region R21a only recognizes the acoustic information output from the application A12.

In addition, as another example, attention is paid to the partial region R21e associated with the application A13 in the active state. The information processing device 100 suppresses the output so that the output amount of the acoustic information output from the application A13 is 50% for the partial region R21e. Further, the information processing device 100 sets the output amount of the acoustic information output from the application A14 operating on the basis of the management of the management software to 100% for the partial region R21e. In other words, the user positioned in partial region R21e recognizes the acoustic information output from the applications A13 and A14. In addition, at this time, the volume of the acoustic information output from the application A13 is smaller than the volume of the acoustic information output from the application A14.

On the basis of the above configuration, the information processing device 100 may control the output amount (that is, the output ratio) of the output information from each application for each partial region.

Note that, the information processing device 100 may be configured so that the output amount of information output from each application for each partial region can be controlled on the basis of the user manipulation on the partial region. As a specific example, the information processing device 100 may receive a predetermined user manipulation performed on the partial region and present a user interface (UI) such as a mixing console for controlling the output ratio of the output information output from each application for the partial region. In this case, the information processing device 100 may control the output amount of the output information from each application to the partial region on the basis of the output ratio set through the UI.

Note that, in the above example, the output amount of the acoustic information output from each application is controlled for each partial region, but information serving as a control target is not necessarily limited to the acoustic information as long as it is possible to control an output amount of information output from each application.

The example in which the information processing device 100 controls the output amount (for example, the volume) of the output information output from each application for each partial region has been described above as the fourth modified example with reference to FIG. 17.

1.5.5. Fifth Modified Example: Region Control Example

Next, an example in which the information processing device 100 receives a user manipulation and controls a form of a partial region designated on the basis of the manipulation or an operation associated with the partial region will be described as a fifth modified example.

As a specific example, the information processing device 100 may change the position or the size of the partial region associated with each application on the basis of an instruction (for example, a user manipulation) given from the user.

Figure 18:
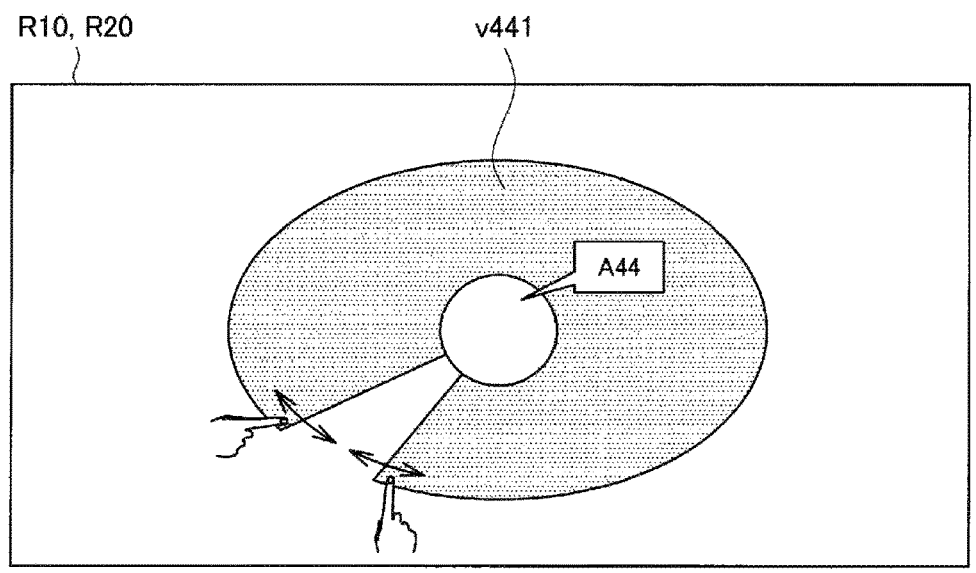
FIG. 18 is an explanatory diagram for describing an overview of an information processing device according to a fifth modified example.

For example, FIG. 18 is an explanatory diagram for describing an overview of the information processing device 100 according to the fifth modified example and illustrates an example in which the information processing device 100 receives a manipulation from the user and changes the position or the size of the partial region.

In the example illustrated in FIG. 18, the information processing device 100 presents the display object v441 indicating a partial region associated with the conference call application A44, and changes the size of the partial region on the basis of the user manipulation performed on the display object v441. Specifically, in the example illustrated in FIG. 18, in a case in which a pinch manipulation performed by the user on the display object v441 is received, the information processing device 100 increases or decreases the size of the partial region associated with the application A44 in accordance with the pinch manipulation.

Figure 19:
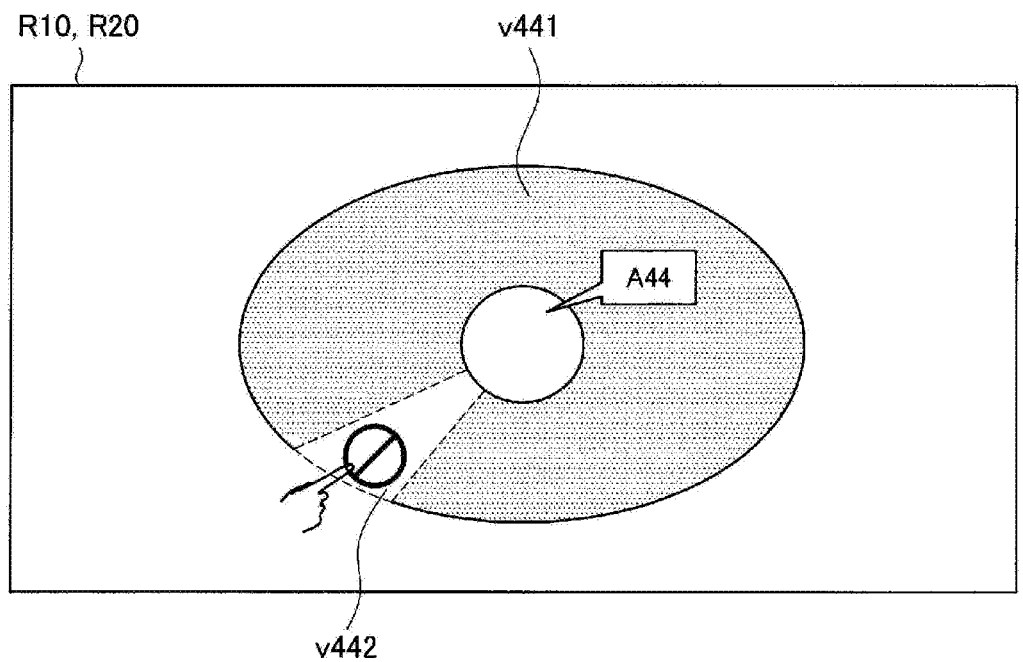
FIG. 19 is an explanatory diagram for describing an overview of an information processing device according to a fifth modified example.

In addition, as another example, FIG. 19 is an explanatory diagram for describing an overview of the information processing device 100 according to the fifth modified example and illustrates an example in which the information processing device 100 receives a manipulation from the user and temporarily stops acquisition of input information from the partial region.

For example, in the example illustrated in FIG. 19, the information processing device 100 presents the display object v441 indicating the partial region associated with the conference call application A44. In addition, when the information processing device 100 receives a predetermined manipulation (for example, a tap manipulation) performed on a region v442 of a part of the display object v441 from the user, the information processing device 100 temporarily stops the input of the acoustic information from the region v442 to the application A44. With this configuration, for example, the user can perform a predetermined manipulation on at least a region of a part of the partial region in which a predetermined application can receive an input, and temporarily stop (that is, partially mute) the input of the acoustic information from the region of the part of the partial region to the application.

In addition, as another example, the information processing device 100 may receive a manipulation for changing the position or the direction of the display object corresponding to the application and change the position or the size of the partial region associated with the application in accordance with the change in the position or the direction of the display object.

Figure 20:
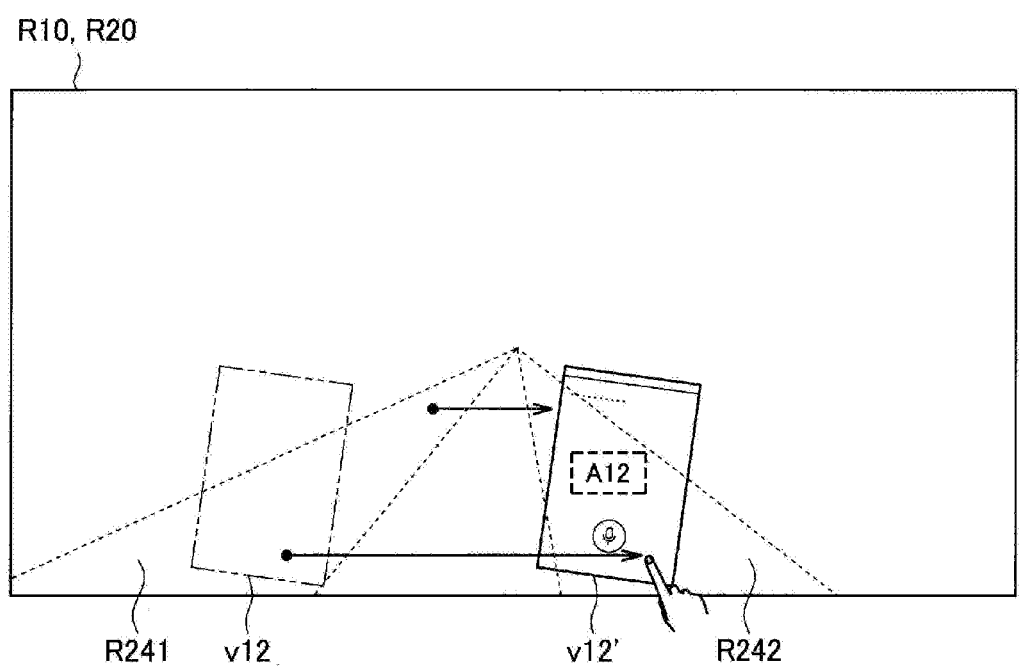
FIG. 20 is an explanatory diagram for describing an overview of an information processing device according to a fifth modified example.

For example, FIG. 20 is an explanatory diagram for describing an overview of the information processing device 100 according to the fifth modified example. In other words, in the example illustrated in FIG. 20, the information processing device 100 receives a manipulation for changing the position of the display object from the user and updates the position of the partial region associated with the application corresponding to the display object.

FIG. 20 illustrates an example in which the user moves the position of the display object corresponding to the application A12 from a position indicated by reference numeral v12 to a position indicated by reference numeral v12', for example, by a drag manipulation. In FIG. 20, reference numeral R241 indicates the partial region associated with the application A12 on the basis of the position of the display object indicated by reference numeral v12. In addition, reference numeral R242 indicates the partial region associated with the application A12 on the basis of the position of the display object indicated by reference numeral v12'.

In other words, in the example illustrated in FIG. 20, in a case in which the position of the display object corresponding to the application A12 is changed on the basis of the manipulation from the user, the information processing device 100 updates the position of the partial region associated with the application A12 in response to the change. As described above, for example, the information processing device 100 sequentially monitors a situation changing in accordance with the manipulation performed by the user or the like, and dynamically changes the association between various kinds of applications and the partial regions in response to the change.

Note that, the example illustrated in FIG. 20 is merely an example, and the information processing device 100 does not have to change the association between various kinds of applications and the partial regions in a case in which the situation changes in accordance with the manipulation performed by the user (for example, in a case in which the position of the display object is changed). In this case, the information processing device 100 preferably associates the application with the partial region at a predetermined timing (for example, a timing at which the application is started, a timing at which the application transitions to the active state, or the like) and maintains the association even in a case in which the situation is changed.

The example in which the information processing device 100 receives the user manipulation and controls the form of the partial region designated on the basis of the manipulation or the operation associated with the partial region has been described as the fifth modified example with reference to FIGS. 10 to 20.

Note that, it will be appreciated that each function described above may be configured to operate regularly or may be configured so that switching between enable and disable is performed on the basis of a predetermined user manipulation.

1.5.6. Sixth Modified Example: Control Example of Input Destination of Input Information Next, an example of control of the information processing device 100 capable of temporarily changing the input destination of the input information in at least one or more partial regions from the application associated with the partial region to another application will be described as the sixth modified example. For example, FIG. 21 is an explanatory diagram for describing an example of control of the information processing device 100 according to the sixth modified example.

Figure 21:
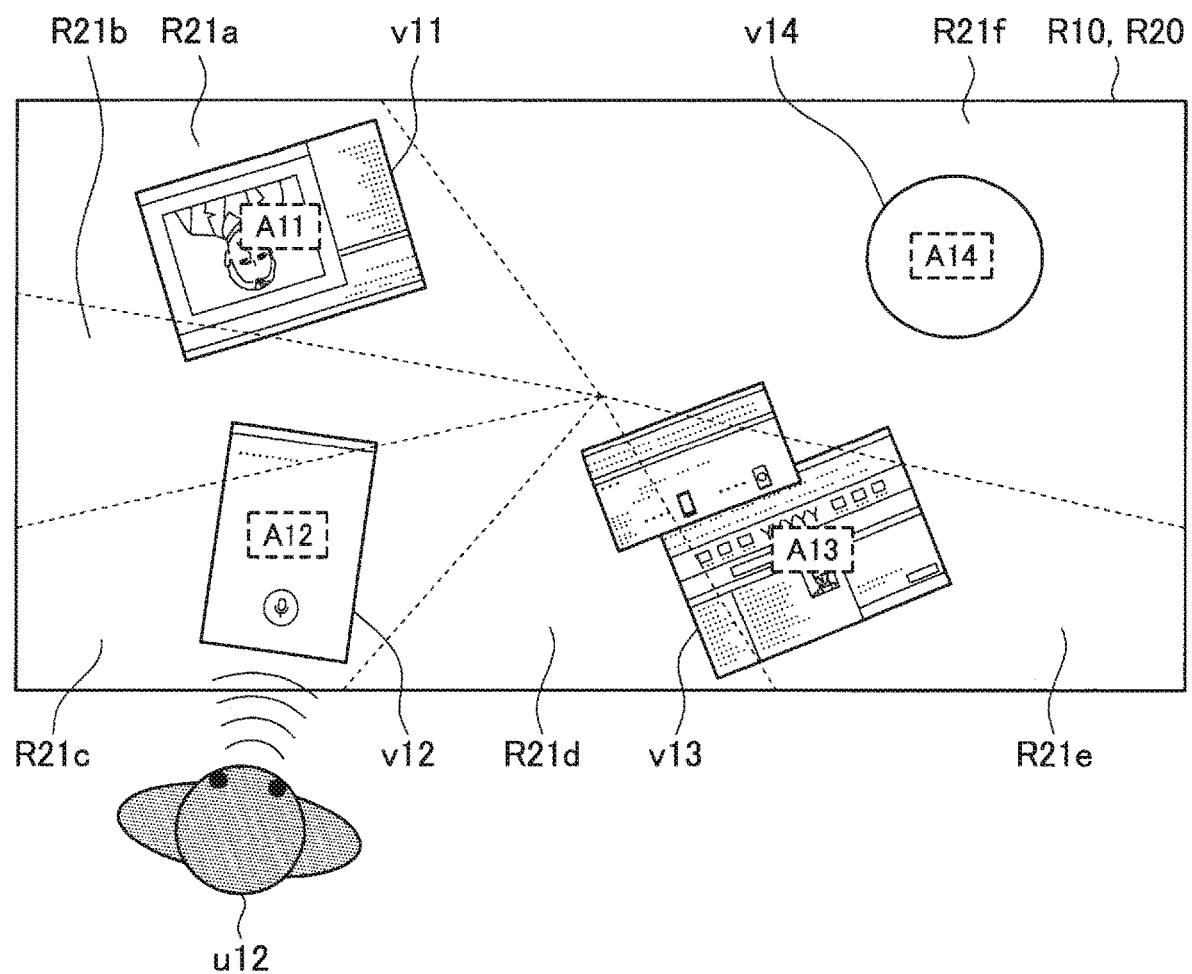
FIG. 21 is an explanatory diagram for describing an example of control of an information processing device according to a sixth modified example.

For example, in the example illustrated in FIG. 21, the applications A11, A12, and A13 are associated with the partial regions R21a, R21c, and R21e among the partial regions R21a to R21f in the sound collection region R20. Further, the management software (for example, sound agent) operating at the OS level is associated with the partial regions R21b, R21d, and R21f. Note that, in the example illustrated in FIG. 21, the music player application A14 is assumed to operate on the basis of the management of the management software operating at the OS level.

In the example illustrated in FIG. 21, the information processing device 100 recognizes a voice spoken by a user u12 manipulating the application A12 as the acoustic information arriving from the partial region R21c, and inputs the acoustic information to the application A12 associated with the partial region R21c.

On the other hand, even in the situation as illustrated in FIG. 21, there are cases in which it is necessary for the user u12 to temporarily input information (for example, sound information) to another application (for example, the music player application A14). In this case, for example, the user u12 can move to a partial region that is associated with a desired application and input information to the desired application, but an operation of inputting the information gets complicated in many cases.

In this regard, the information processing device 100 according to the sixth modified example provides a function of temporarily changing an application serving as the input destination of the input information input from a desired partial region, on the basis of a predetermined manipulation performed by the user.

For example, in a case in which the information processing device 100 detects a predetermined word (hereinafter also referred to as a "magic word") in voices (that is, input voices) spoken by the user, the information processing device 100 recognizes a voice subsequent to the magic word as control information. Then, the information processing device 100 temporarily changes the input destination of the acoustic information (that is, the voice input) output from the partial region on the basis of content of the recognized control information.

As a specific example, it is assumed that the user u12 positioned in the partial region R21c speaks "change music to next song" as the control information for manipulating the music player application A14 after speaking the magic word.

In this case, the information processing device 100 first detects the magic word as a result of a recognition process on the voice input from the user u12 acquired from the partial region R21c. Then, with the detection of the magic word, the information processing device 100 performs semantic analysis on the control information subsequent to the magic word and recognizes that content thereof is a manipulation of the music player application A14. In other words, in this case, the information processing device 100 temporarily changes the input destination of the voice input acquired from the partial region R21c from the application A12 associated with the partial region R21c to the music player application A14.

With this configuration, in the example illustrated in FIG. 21, the user u12 need not perform a complicated manipulation such as position movement in order to input information to the music player application A14.

In addition, as another example, the information processing device 100 may be configured to be able to input an instruction to the management software (for example, the sound agent) operating at the OS level, as the control information.

As a specific example, the user u12 is assumed to speak "turn off system" as the control information for giving an instruction to the management software operating at the OS level, after speaking the magic word.

In this case, the information processing device 100 detects the magic word as a result of the recognition processing performed on the voice input, performs the semantic analysis on the control information subsequent to the magic word, and recognizes that content thereof is an instruction given to the management software operating at the OS level. Then, the information processing device 100 inputs the acquired voice input "turn off system" to the management software operating at the OS level. In other words, in this case, the management software operating at the OS level receives the voice input and turns off the system.

Note that, examples of the instruction given to the management software operating at the OS level include turning on/off of a computer (that is, start and end of a system), turning on/off of a connected illumination device, a setting of various kinds of systems, and activation/deactivation of an application.

Figure 22:
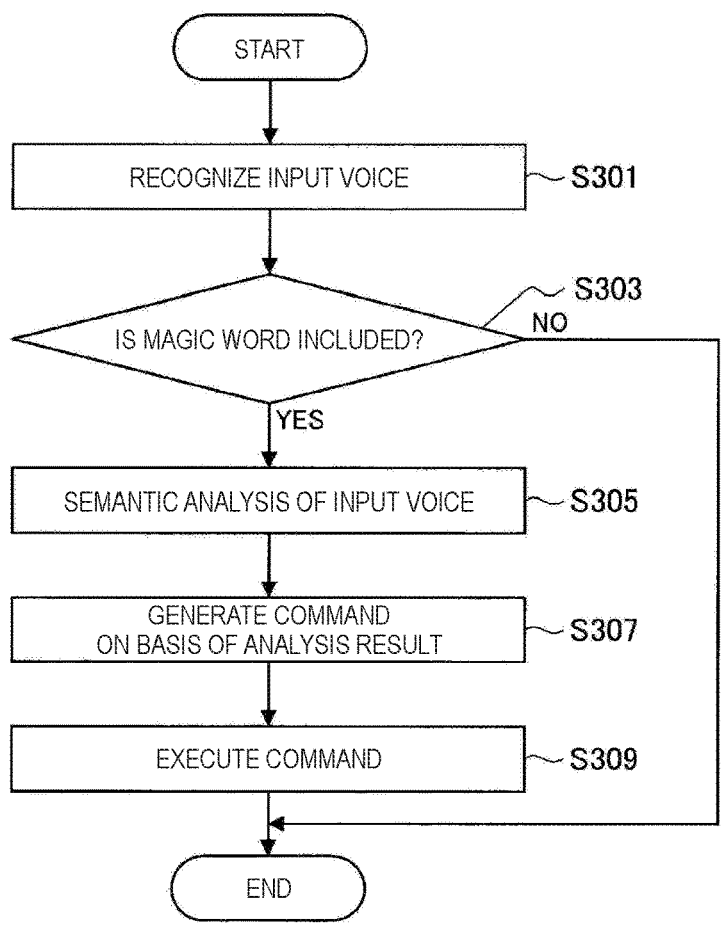
FIG. 22 is a flowchart illustrating an example of a flow of a series of processes of the information processing device according to the sixth modified example.

Next, an example of a flow of a series of processes of the information processing device 100 according to the sixth modified example will be described with reference to FIG. 22, particularly, focusing on an operation in which the information processing device 100 identifies whether or not the input voice includes the control information and performs corresponding control in a case in which the input voice is the control information. FIG. 22 is a flowchart illustrating an example of a flow of a series of processes of the information processing device 100 according to the sixth modified example.

(Step S301)

The information processing device 100 identifies and acquires the input voice (that is, the acoustic information) from each user for each partial region, and recognizes content of the acquired input voice as, for example, character information on the basis of a technique such as speech recognition. Then, the information processing device 100 can extract an expression such as words included in the input voice by, for example, performing syntax analysis on the content of the input voice recognized as the character information.

(Step S303)

When the information processing device 100 recognizes the content of the acquired input voice, the information processing device 100 checks whether or not the magic word is included in the recognized input voice.

(Step S305)

In a case in which the magic word is included in the recognized input voice (YES in step S303), the information processing device 100 recognizes the voice subsequent to the magic word as the control information, performs the semantic analysis on the control information, and recognizes the content of the control information. As a concrete example, the user is assumed to speak "turn off system" after speaking the magic word. In this case, the information processing device 100 recognizes the voice "turn off system" as the control information and recognizes that the control information is an instruction to turn off the system from a result of the semantic analysis performed on the recognized control information.

(Steps S307, S309)

When the semantic analysis is performed on the recognized control information, the information processing device 100 generates a command to execute control corresponding to the control information from the result of the semantic analysis (step S307) and executes the generated command (step S309).

As a specific example, in a case in which the information processing device 100 recognizes an instruction related to turning-off of a system with regard to the management software operating at the OS level, the information processing device 100 generates a command to cause the management software to execute the instruction related to the turning-off of the system on the basis of the instruction. Subsequently, when the command generated by the information processing device 100 is executed, the management software turns off the system in accordance with the execution of the command.

Note that, entities of performing the semantic analysis on the control information, generating the command based on the result of the semantic analysis, and performing the process related to the execution of the generated command are not particularly limited. As a specific example, for example, some or all of these processes may be performed by the management software (for example, the sound agent) operating at the OS level.

The example of the control of the information processing device 100 capable of temporarily changing the input destination of the input information input from some partial regions from the application associated with the partial region to another application has been described as the sixth modified example with reference to FIGS. 21 and 22.

Note that, in the example described above, the information processing device 100 recognizes the control information by using the magic word, but a method thereof is not particularly limited as long as the information processing device 100 can recognize that the input information is the control information. As a specific example, in a case in which the information processing device 100 recognizes a predetermined touch manipulation (for example, a tap manipulation) or a predetermined gesture manipulation, the information processing device 100 may recognize that input information that has been input subsequently is the control information.

1.6. Conclusion

As described above, the information processing device 100 according to the present embodiment estimates the partial region R21 in which the sound source of the acoustic information is positioned (that is, the arrival direction of the acoustic information) in accordance with the sound collection result of the acoustic information acquired by each of a plurality of sound collecting units 113 included in the input unit 110. With this configuration, the information processing device 100 identifies and acquires the acoustic information arriving from each partial region R21 in the sound collection region R20 for each partial region R21.

Further, the information processing device 100 associates the application manipulated by each user (for example, to which the voice input is performed) with the partial region R21 in the sound collection region R20 in accordance with the state or the context of the application. Then, the information processing device 100 allocates the acoustic information identified and acquired for each partial region R21 to the application associated with the partial region R21.

With the above configuration, the information processing device 100 can identify and acquire the voice input from each user even in the situation in which a plurality of users simultaneously perform manipulations and input each acquired voice input to an application manipulated by each of the users.

Note that, in the above example, the display surface R10 and the sound collection region R20 have been described as substantially coinciding with each other in order to further facilitate understanding of features of the information processing device 100. However, as described above, the display surface R10 and the sound collection region R20 need not necessarily be identical in the size or the position thereof.

Further, the configuration of the information processing device 100 is not limited to the example described above as long as various kinds of applications that are in operation are associated with the partial region R21 in the sound collection region R20, and the input information acquired from the partial region R21 is input to the application associated with the partial region R21. For example, the information processing device 100 may not have a configuration for causing the display information to be displayed on the display surface R10. As a specific example, the information processing device 100 may be configured as an interactive sound agent that presents information to the user by voice in response to the voice input from the user.

2. SECOND EMBODIMENT

2.1. Overview

Next, an example of the information processing device 100 according to a second embodiment of the present disclosure will be described. The first embodiment has been described in connection with an example in which the information processing device 100 acquires the acoustic information such as a voice as the input information and controls the input destination of the acoustic information. On the other hand, the input information is not necessarily limited to the acoustic information. In this regard, in the present embodiment, an example in which the information processing device 100 causes a video chat application to be operated will be described as an example in which the information processing device 100 acquires video information as input information other than the acoustic information and controls the input destination of the video information.

Figure 23:
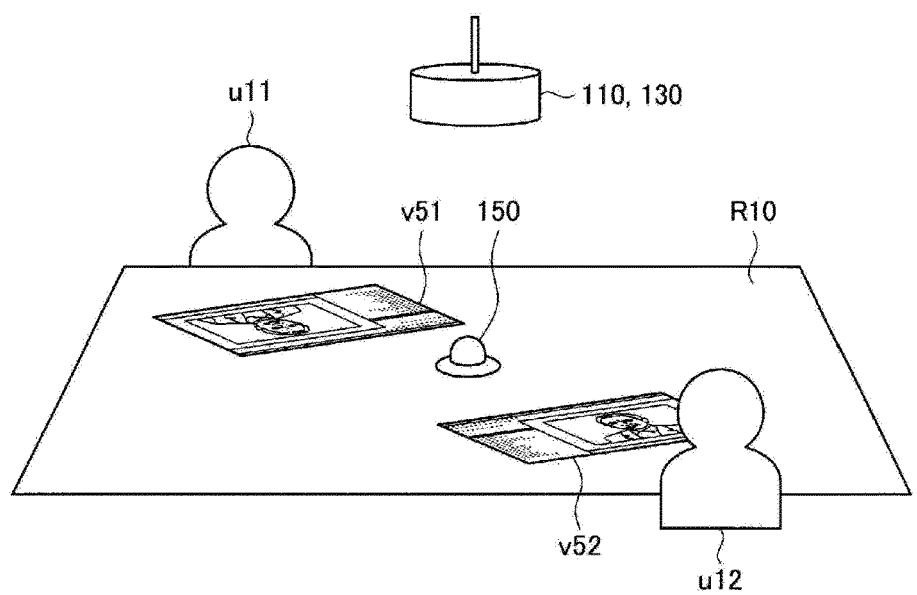
FIG. 23 is an explanatory diagram for describing an overview of an information processing device according to a second embodiment of the present disclosure.

For example, FIG. 23 is an explanatory diagram for describing an overview of the information processing device 100 according to the present embodiment and illustrates an example of a schematic configuration of the information processing device 100. Note that, FIG. 23 illustrates an example in which the information processing device 100 is configured as a projection type as illustrated in FIG. 1. Note that, in the following description, a configuration and processing content of the information processing device 100 according to the present embodiment will be described focusing on portions different from the information processing device 100 according to the first embodiment, and detailed descriptions of similar portions are omitted.

In FIG. 23, reference numeral v51 indicates a display object corresponding to a video chat application manipulated by a user u11. Similarly, reference numeral v52 indicates a display object corresponding to a video chat application manipulated by a user u12.

As illustrated in FIG. 23, the information processing device 100 according to the present embodiment includes an imaging unit 150 that captures a video of the user manipulating the video chat application. Note that, in the following description, in order to distinguish the imaging unit 111 included in the input unit 110 (that is, the imaging unit for capturing the image of the display surface R10) and the imaging unit 150 that captures the video of the user from each other, sometimes the imaging unit 111 is also referred to as a "first imaging unit 111," and the imaging unit 150 is also referred to as a "second imaging unit 150."

The second imaging unit 150 may be configured as a wide-angle camera (for example, an upward wide-angle camera) capable of capturing an image of a 360° range such as a so-called omnidirectional camera. In addition, for example, the second imaging unit 150 is installed at a desired position on the display surface R10.

Figure 24:
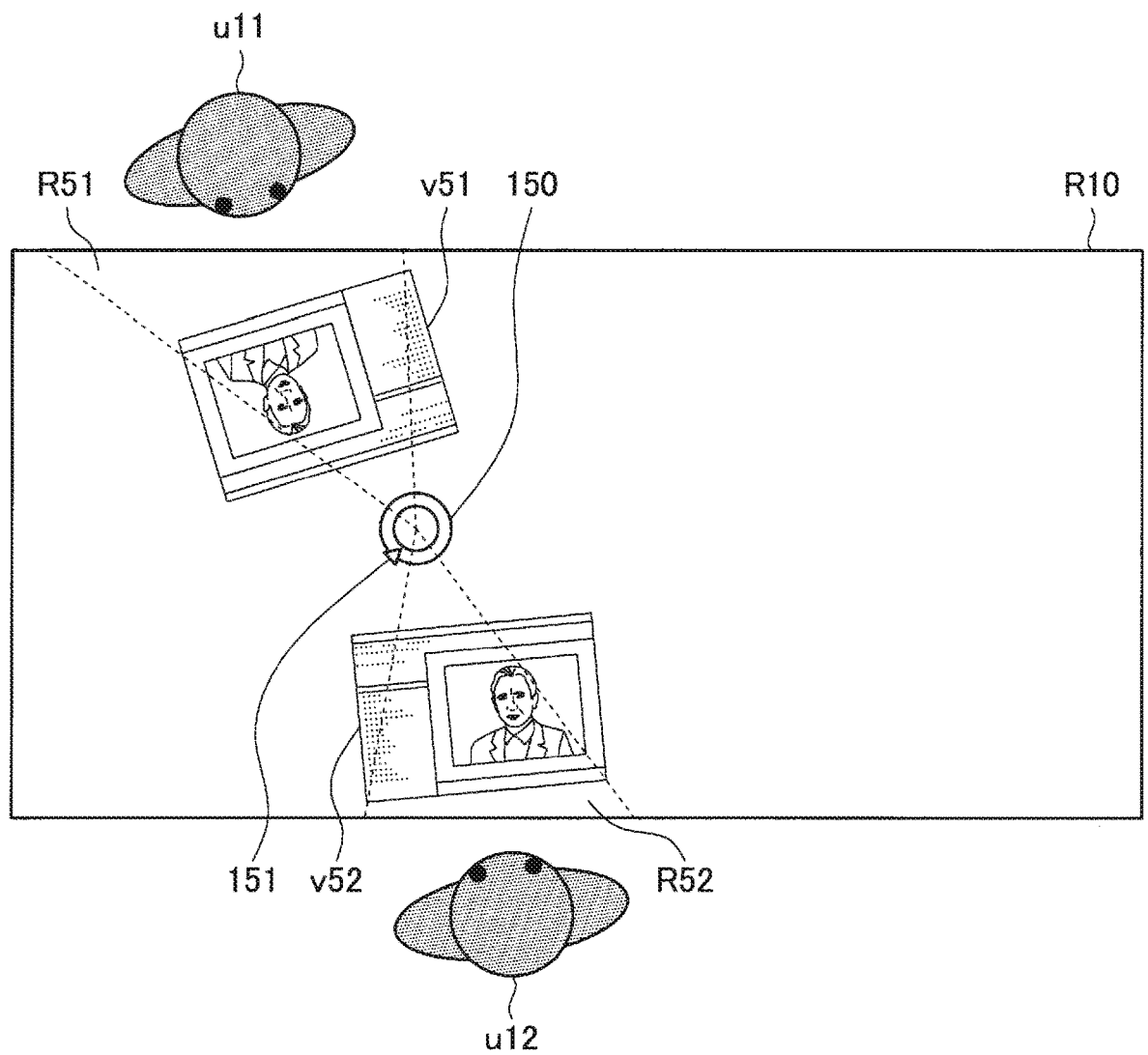
FIG. 24 is an explanatory diagram for describing an example of control performed by the information processing device according to the embodiment.

The information processing device 100 acquires an image around the second imaging unit 150 (that is, the image around the display surface R10) from the second imaging unit 150 installed on the display surface R10. Then, the information processing device 100 clips partial images of the users u11 and u12 performing manipulations on the display objects v51 and v52 from the acquired image and allocates each of the clipped partial images to applications corresponding to the display objects v51 and v52. In this regard, such an operation of the information processing device 100 will be described in detail with reference to FIG. 24. FIG. 24 is an explanatory diagram for describing an example of control performed by the information processing device 100 according to the present embodiment.

In FIG. 24, reference numerals R51 and R52 indicate respective partial regions included in an imaging region in which the second imaging unit 150 is capable of capturing an image. In other words, the information processing device 100 according to the present embodiment associates the video chat applications manipulated by the respective users with the partial regions in the imaging region of the second imaging unit 150. Then, the information processing device 100 clips an image (that is, a video input) corresponding to each partial region from the image acquired from the second imaging unit 150 and allocates the image clipped for each partial region to the application associated with the partial region.

Specifically, as illustrated in FIG. 24, a marker 151 for specifying the position or the direction of the second imaging unit 150 is attached to the second imaging unit 150. The information processing device 100 analyzes the image of the display surface R10 captured through the first imaging unit 111 in the input unit 110, and specifies the position and the direction of the second imaging unit 150 in the display surface R10 on the basis of the second imaging unit 150 and the marker 151 captured in the image.

Then, the information processing device 100 specifies the partial region to be associated with the application on the basis of the position and the direction of the second imaging unit 150 and information indicating the state or the context of the application (for example, the video chat application) using the image captured by the second imaging unit 150.

For example, in the example illustrated in FIG. 24, the information processing device 100 specifies the partial region associated with the application on the basis of the position and the direction of the second imaging unit 150 and the position, the direction, and the size of the display object corresponding to each application.

As a specific example, the information processing device 100 estimates a relative position of the user u11 with respect to the second imaging unit 150 on the basis of the position and the direction of the second imaging unit 150 and the position, the direction, and the size of a display object v51 under the assumption that the user u11 faces the display object v51. The information processing device 100 specifies the partial region R51 extending toward the position of the user u11 estimated from the position of the second imaging unit 150 on the basis of the estimated relative position of the user u11 with respect to the second imaging unit 150. Then, the information processing device 100 associates the video chat application corresponding to the display object v51 (that is, the application of controlling the display of the display object v51) with the specified partial region R51.

Similarly, the information processing device 100 estimates a relative position of the user u12 with respect to the second imaging unit 150 on the basis of the position and the direction of the second imaging unit 150 and the position, the direction, and the size of the display object v52. Next, the information processing device 100 specifies the partial region R52 on the basis of the estimated relative position of the user u11 with respect to the second imaging unit 150 and associates the video chat application corresponding to the display object v52 with the specified partial region R51.

Then, the information processing device 100 acquires the image captured by the second imaging unit 150 and clips the partial image corresponding to the partial region associated with each application from the acquired image on the basis of the recognized position and the direction of the second imaging unit 150.

As a specific example, the information processing device 100 specifies a direction in which the partial region R51 extends based on the second imaging unit or a size of the partial region R51 on the basis of the recognized position and the direction of the second imaging unit 150. Then, the information processing device 100 clips the image in the specified direction in which the specified partial region R51 extends from the image captured by the second imaging unit 150. At this time, the information processing device 100 may specify an angle of view of the image to be clipped on the basis of the size of the partial region R51.

Similarly, the information processing device 100 specifies a direction in which the partial region R52 extends based on the second imaging unit or a size of the partial region R51 on the basis of the recognized position and the direction of the second imaging unit 150. Then, the information processing device 100 clips the image in the specified direction in which the specified partial region R52 extends from the image captured by the second imaging unit 150.

As described above, the information processing device 100 identifies and acquires the partial image corresponding to each partial region from the image captured by the second imaging unit 150 for each partial region.

When the partial image corresponding to each partial region is acquired, the information processing device 100 inputs the partial image acquired for each partial region to the application associated with the partial region.

As a specific example, the information processing device 100 allocates the partial image of the partial region R51 to the application associated with the partial region R51, that is, the video chat application corresponding to the display object v51. Similarly, the information processing device 100 allocates the partial image of the partial region R52 to the application associated with the partial region R52, that is, the video chat application corresponding to the display object v51.

As described above, the information processing device 100 according to the present embodiment identifies each partial region from the image captured by the second imaging unit 150 and acquires a partial image obtained by imaging the partial region. Then, the information processing device 100 allocates the partial image acquired for each partial region to the application associated with the partial region.

With the above-described configuration, the information processing device 100 according to the present embodiment can identify and acquire the video input of each user even in the situation in which a plurality of users simultaneously perform manipulations, and can input the acquired video input of each user to the application manipulated by the user.

2.2. Functional Configuration

Figure 25:
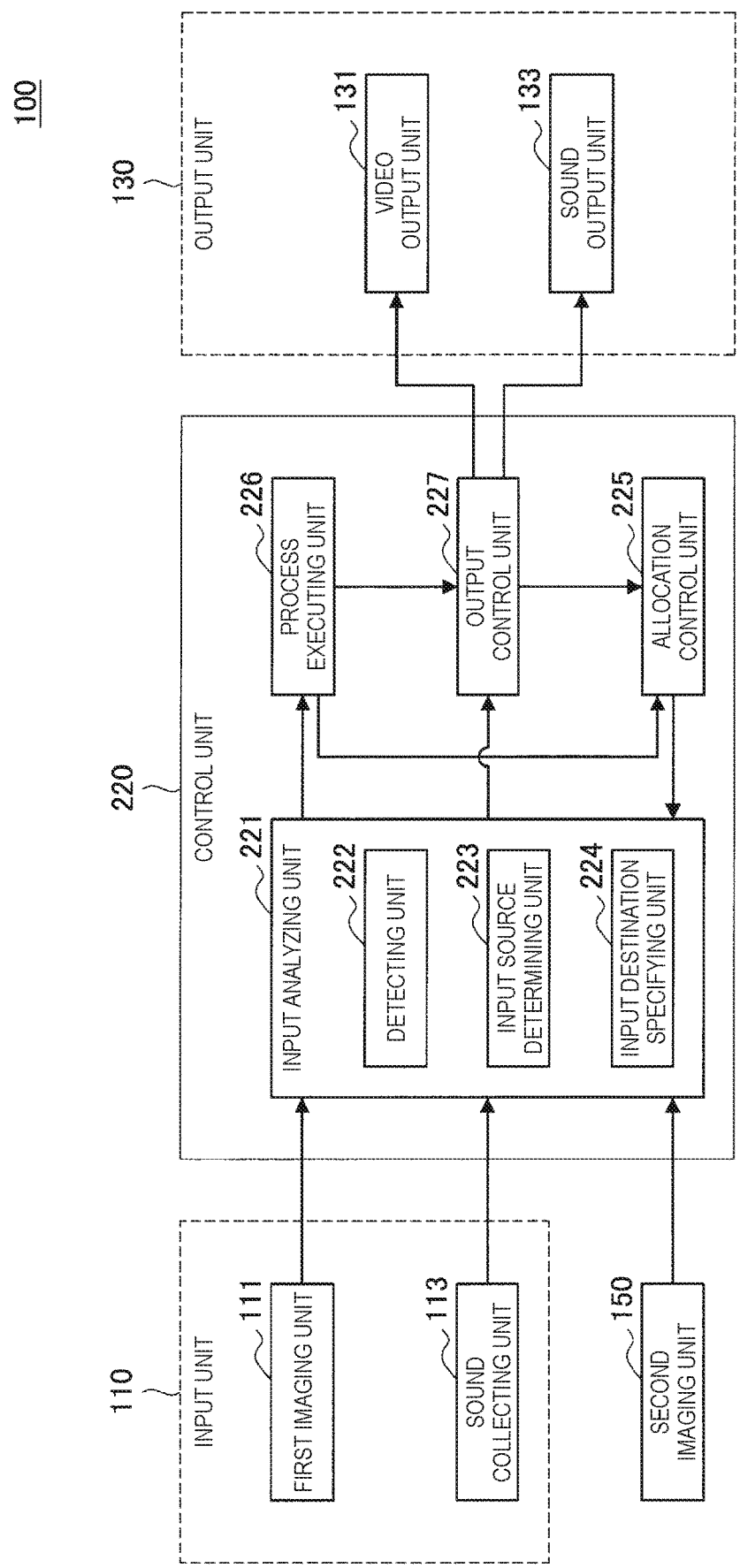
FIG. 25 is a block diagram illustrating an example of a functional configuration of the information processing device according to the embodiment.

Next, an example of a functional configuration of the information processing device 100 according to the present embodiment will be described with reference to FIG. 25. FIG. 25 is a block diagram illustrating an example of a functional configuration of the information processing device 100 according to the present embodiment.

As illustrated in FIG. 25, the information processing device 100 according to the present embodiment includes an input unit 110, a control unit 220, an output unit 130, and a second imaging unit 150. Note that, the input unit 110 and the output unit 130 are similar to the input unit 110 and the output unit 130 (see FIG. 8) according to the first embodiment.

Further, the control unit 220 includes an input analyzing unit 221, an allocation control unit 225, a process executing unit 226, and an output control unit 227. In addition, the input analyzing unit 221 includes a detecting unit 222, an input source determining unit 223, and an input destination specifying unit 224. Note that, the control unit 220 corresponds to the control unit 120 according to the first embodiment. Specifically, the process executing unit 226 and the output control unit 227 are similar to the process executing unit 126 and the output control unit 127 according to the first embodiment.

In addition, the input analyzing unit 221 corresponds to the input analyzing unit 121 according to the first embodiment, and the operations of the input source determining unit 223 and the input destination specifying unit 224 are mainly different from those of the input source determining unit 123 and the input destination specifying unit 124 according to the first embodiment. Further, the allocation control unit 225 corresponds to the above-described allocation control unit 125 according to the first embodiment and is partially different in content of a process from that of the allocation control unit 125 according to the first embodiment.

Therefore, the allocation control unit 225, the input source determining unit 223, and the input destination specifying unit 224 which are different from those of the information processing device 100 according to the first embodiment will be mainly described below in detail, and detailed description of the other components will be omitted.

The allocation control unit 225 acquires information indicating the state or the context of various kinds of applications that are in operation, from the process executing unit 126 or the output control unit 127. Further, the allocation control unit 225 acquires a detection result of an object placed in the display surface R10 from the detecting unit 222 and specifies the position and the direction of the second imaging unit 150 installed on the display surface R10 on the basis of the detection result.

Then, the allocation control unit 225 specifies the size or the position of the partial region in the imaging region of the second imaging unit 150 to be associated with the application on the basis of the information indicating the state or the context of various kinds of acquired applications and the specified position and the direction of the identified second imaging unit 150.

As a specific example, the information processing device 100 specifies the partial region associated with the application on the basis of the position and the direction of the second imaging unit 150 and the position, the direction, and the size of the display object corresponding to each application.

Note that, the allocation control unit 225 may associate the management software operating at the OS level with the partial regions other than the partial region associated with the application among the partial regions in the imaging region.

Further, similarly to the allocation control unit 125 according to the first embodiment, the allocation control unit 225 may perform control such that the association between the application and the partial region is canceled in accordance with the context or the state of the application associated with the partial region.

Further, a timing at which the allocation control unit 225 executes the above-described process is not particularly limited as in the above-described allocation control unit 125 according to the first embodiment.

The input source determining unit 223 is a component for acquiring the image captured by the second imaging unit 150 and identifying and acquiring the partial image corresponding to each partial region from the image for each partial region.

Specifically, the input source determining unit 223 acquires the image captured by the second imaging unit 150 at a predetermined timing. Further, the input source determining unit 223 acquires information indicating the position and the direction of the second imaging unit 150 and information indicating the size or the position of each partial region from the allocation control unit 125. The input source determining unit 223 recognizes the position and the direction of the second imaging unit 150 and the size or the position of each partial region on the basis of the acquired information.

The input source determining unit 223 specifies a direction in which each partial region extends based on the second imaging unit or the size of the partial region on the basis of the recognized position and the direction of the second imaging unit 150 and the size or the position of each partial region. Then, the information processing device 100 clips the image in the direction in which the identified partial region extends from the image captured by the second imaging unit 150. At this time, the information processing device 100 may specify an angle of view of the image to be clipped on the basis of the size of the partial region.

As described above, the input source determining unit 223 identifies and the acquires the partial image corresponding to each partial region from the image captured by the second imaging unit 150 for each partial region. Then, the input source determining unit 223 outputs the partial image corresponding to the partial region to the input destination specifying unit 224 for each partial region.

The input destination specifying unit 224 acquires the partial image corresponding to the partial region from the input source determining unit 223 for each partial region. Further, the input destination specifying unit 224 acquires information indicating each application that is in operation and the partial region associated with the application, from the allocation control unit 225.

The input destination specifying unit 224 specifies the application associated with the partial region for each partial region on the basis of the information acquired from the allocation control unit 225 as the input destination of the partial image in which a portion acquired from the input source determining unit 223 corresponds to a region. Then, the input destination specifying unit 224 allocates the partial image of each partial region to the application specified as the input destination of the partial image.

As described above, the information processing device 100 according to the present embodiment identifies each partial region from the image captured by the second imaging unit 150 and acquires a partial image obtained by imaging the partial region. Then, the information processing device 100 allocates the partial image acquired for each partial region to the application associated with the partial region.

Note that, the information processing device 100 according to the present embodiment may presents (notify) the user with (of) the information indicating the partial region associated with each application, similarly to the information processing device 100 according to the third modified example of the first embodiment.

Figure 26:
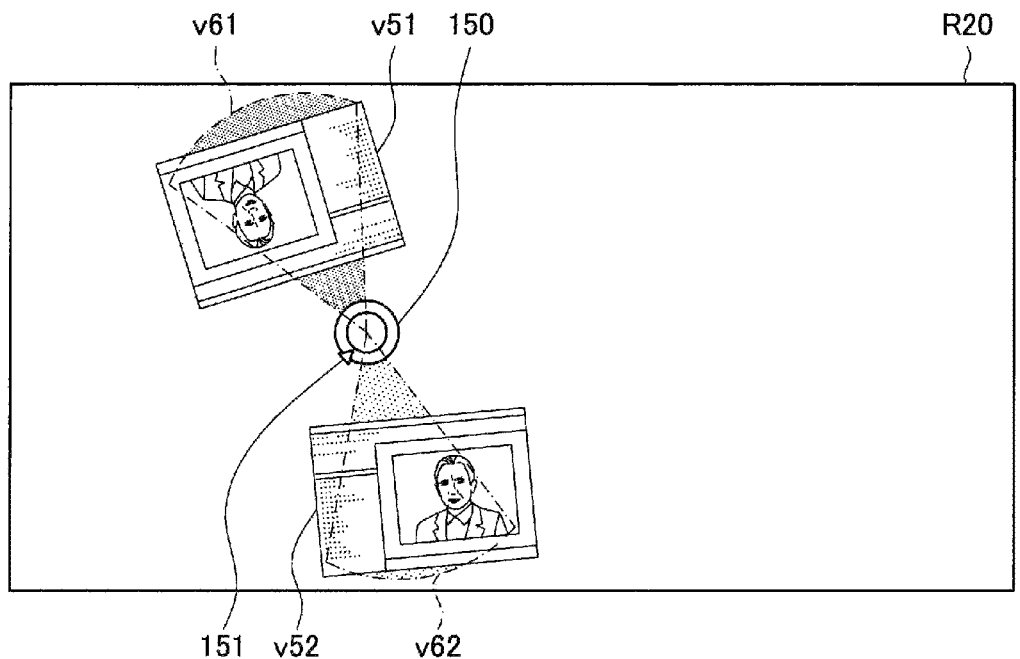
FIG. 26 is an explanatory diagram for describing an example of a method of presenting each partial region to the user through the information processing device according to the embodiment.

For example, FIG. 26 is an explanatory diagram for describing an example of a method of presenting the user with each partial region through the information processing device 100 according to the present embodiment and illustrates an example in which display objects indicating the partial regions are presented on the display surface R10.

In FIG. 26, reference numeral v61 indicates an example of a display object for identifiably presenting the user with the partial region with which the application corresponding to the display object v51 is associated. Similarly, reference numeral v62 indicates an example of a display object for identifiably presenting the user with the partial region associated with the application corresponding to the display object v52. In other words, in the example illustrated in FIG. 26, the information processing device 100 causes each partial region associated with the application to be presented on the display surface R10 as a fan-like display object.

In this case, for example, the output control unit 227 of the control unit 220 acquires information indicating the size or the position of the partial region in the imaging region of the second imaging unit 150 associated with each application that is in operation from the allocation control unit 225. Then, the output control unit 227 preferably generates a display object indicating the partial region on the basis of the acquired information indicating the size or the position of each partial region, and causes the generated display object to be displayed on the video output unit 131.

Further, the information processing device 100 according to the present embodiment may receive the user manipulation and control the form of the partial region designated on the basis of the manipulation or the operation associated with the partial region, similarly to the information processing device 100 according to the fifth modified example of the first embodiment.

Figure 27:
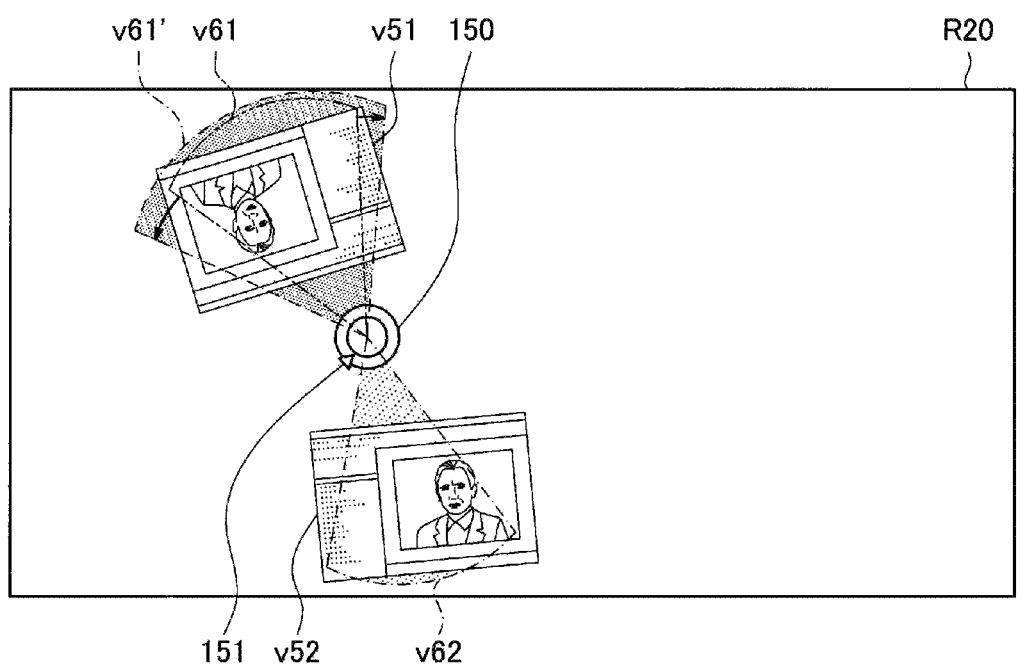
FIG. 27 is an explanatory diagram for describing an example in which the information processing device according to the embodiment controls a form of a partial region.

For example, FIG. 27 is an explanatory diagram for describing an example in which the information processing device 100 according to the present embodiment controls the form of the partial region and illustrates an example in which the information processing device 100 receives a manipulation from the user and changes the position or the size of the partial region.

In the example illustrated in FIG. 27, the information processing device 100 presents a display object v61 indicating a partial region associated with the application corresponding to the display object v51 and changes the size of the partial region on the basis of the user manipulation on the display object v61. More specifically, in the example illustrated in FIG. 27, the information processing device 100 receives a pinch manipulation indicating an increase in a range of the display object v61 performed by the user and increases the range of the display object v61 to a range indicated by reference numeral v61'.

In other words, in a case in which the display object v61 is increased to the range indicated by the reference numeral v61' on the basis of the user manipulation, the information processing device 100 increases the range of the corresponding partial region on the basis of the range v61' of the display object after the increase. With the increase in the partial region, the information processing device 100 preferably changes a range in which the partial image corresponding to the partial region is clipped (that is, an angle of view) from the image acquired from the second imaging unit 150.

Of course, the information processing device 100 may change the position of the corresponding partial region on the basis of the user manipulation performed on the display object v61. In this case, with the change in the position of the partial region, the information processing device 100 may change a direction in which the partial image corresponding to the partial region is clipped from the image acquired from the second imaging unit 150.

2.3. Conclusion

As described above, the information processing device 100 according to the present embodiment identifies each partial region from the image captured by the second imaging unit 150 and acquires a partial image obtained by imaging the partial region. Then, the information processing device 100 allocates the partial image acquired for each partial region to the application associated with the partial region.

With the above-described configuration, the information processing device 100 according to the present embodiment can identify and acquire the video input of each user even in the situation in which a plurality of users simultaneously perform manipulations, and can input the acquired video input of each user to the application manipulated by the user.

Note that, in the example described above, a wide-angle camera capable of capturing an image of a 360° range is applied as a component for acquiring the image of each user positioned around the display surface R10. On the other hand, as long as the image of each user positioned around the display surface R10 can be acquired, a configuration thereof is not particularly limited. As a specific example, a hemispherical mirror may be installed instead of the second imaging unit 150, and in this case, an image of a region around the mirror (that is, an image around the display surface R10) reflected by the hemispherical mirror may be imaged and acquired by the first imaging unit 111 of the input unit 110 positioned above the mirror.

Further, the above-described information processing device 100 according to the first embodiment is not necessarily limited to the projection type as illustrated in FIG. 1, and for example, the rear projection type illustrated in FIG. 2 or a touch panel type display illustrated in FIG. 3 may be used. Note that, in this case, for example, the information processing device 100 preferably specifies the position or the direction of the second imaging unit 150 installed on the display surface R10 by using detection results of various types of sensors such as a capacitive touch sensor or an optical touch sensor, for example. In addition, as another example, the position or the direction of the second imaging unit 150 may be designated by the user. In this case, it will be appreciated that it is preferable for the information processing device 100 to recognize the position or the direction of the second imaging unit 150 on the basis of the user manipulation.

Further, the information processing device 100 according to the present embodiment and the information processing device 100 according to the first embodiment may be combined to be able to individually acquire both the voice input and the video input. In this case, preferably, the information processing device 100 separately manages a partial region indicating an acquisition source of the voice input and a partial region indicating an acquisition source of the video input and associates the application with each of the partial regions corresponding to the voice input and the video input. In other words, in a case in which the voice input is acquired, the information processing device 100 preferably specifies the application serving as the input destination of the voice input on the basis of the partial region indicating the acquisition source of the voice input. Similarly, for the video input, the information processing device 100 preferably specifies the application serving as the input destination of the video input on the basis of the partial region indicating the acquisition source of the video input.

3. HARDWARE CONFIGURATION EXAMPLE

Figure 28:
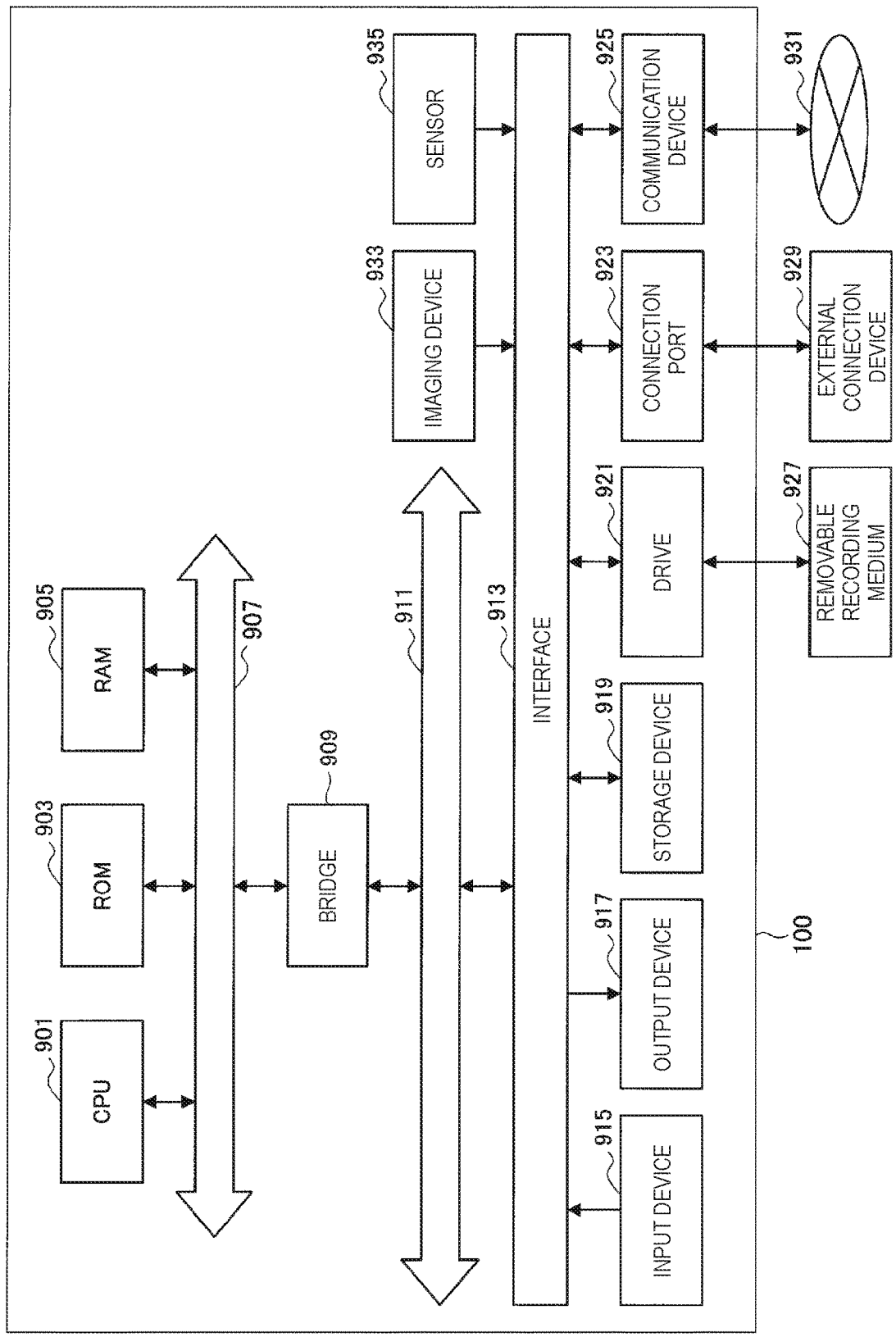
FIG. 28 is a block diagram illustrating a hardware configuration example of an information processing device according to one embodiment of the present disclosure.

Next, a hardware configuration of the information processing device 100 according to an embodiment of the present disclosure will be described with reference to FIG. 28. FIG. 28 is a block diagram illustrating a hardware configuration example of the information processing device 100 according to an embodiment of the present disclosure.

As illustrated in FIG. 28, the information processing device 100 includes a central processing unit (CPU) 901, a read only memory (ROM) 903, and a random access memory (RAM) 905. In addition, the information processing device 100 may include a host bus 907, a bridge 909, an external bus 911, an interface 913, an input device 915, an output device 917, a storage device 919, a drive 921, a connection port 923, and a communication device 925. Further, the information processing device 100 may include an imaging device 933 and a sensor 935 as necessary. The information processing device 100 may include a processing circuit such as a digital signal processor (DSP) or an application specific integrated circuit (ASIC) instead of or in addition to the CPU 901.

The CPU 901 serves as an operation processing device and a control device, and controls all of or a part of the operations in the information processing device 100 in accordance with various programs recorded in the ROM 903, the RAM 905, the storage device 919 or a removable recording medium 927. The ROM 903 stores programs and operation parameters used by the CPU 901. The RAM 905 temporarily stores program used in the execution of the CPU 901 and parameters that changes as appropriate in the execution. The CPU 901, ROM 903, and RAM 905 are connected to each other by the host bus 907 including an internal bus such as a CPU bus. In addition, the host bus 907 is connected to the external bus 911 such as a peripheral component interconnect/interface (PCI) bus via the bridge 909.

The input device 915 is, for example, a device operated by a user with a mouse, a keyboard, a touch panel, buttons, switches, a lever, and the like. The input device 915 may include a mic that detects a sound of a user. The input device 915 may be, for example, a remote control unit using infrared light or other radio waves, or may be an external connection device 929 such as a portable phone operable in response to the operation of the information processing device 100. The input device 915 includes an input control circuit that generates an input signal on the basis of the information input by a user and outputs the input signal to the CPU 901. By operating the input device 915, a user can input various types of data to the information processing device 100 or issue instructions for causing the information processing device 100 to perform a processing operation. In addition, the imaging device 933 to be described below can function as an input device by imaging a motion or the like of a hand of the user.

The output device 917 includes a device capable of visually or audibly notifying a user of the acquired information. The output device 917 may be, for example, a display device such as a liquid crystal display (LCD), a plasma display panel (PDP), an organic electro-luminescence (EL) display, and a projector, a hologram display device, an audio output device, such as a speaker or a headphone, and a printer. The output device 917 outputs the results obtained from the process of the information processing device 100 in a form of video such as text or an image and audio such as voice or sound. In addition, the output device 917 may include a light or the like to brighten the surroundings.

The storage device 919 is a device for data storage configured as an example of a storage unit of the information processing device 100. The storage device 919 includes, for example, a magnetic storage device such as a hard disk drive (HDD), a semiconductor storage device, an optical storage device, or a magneto-optical storage device. The storage device 919 stores programs to be executed by the CPU 901, various data, and data obtained from the outside.

The drive 921 is a reader/writer for the removable recording medium 927 such as a magnetic disk, an optical disk, a magneto-optical disk, or a semiconductor memory, and is embedded in the information processing device 100 or externally attached thereto. The drive 921 reads information recorded in the attached removable recording medium 927 and outputs the information to the RAM 905. Further, the drive 921 writes record in the attached removable recording medium 927.

The connection port 923 is a port used to directly connect devices to the information processing device 100. The connection port 923 may be, for example, a universal serial bus (USB) port, an IEEE1394 port, a small computer system interface (SCSI) port, or the like. In addition, the connection port 923 may be an RS-232C port, an optical audio terminal, High-Definition Multimedia Interface (HDMI) (registered trademark) port, or the like. By connecting the external connection device 929 to the connection port 923, various data may be exchanged between the information processing device 100 and the external connection device 929.

The communication device 925 is, for example, a communication interface including a communication device or the like for connection to a communication network 931. The communication device 925 may be, for example, a communication card for a wired or wireless local area network (LAN), Bluetooth (registered trademark), wireless USB (WUSB), or the like. In addition, the communication device 925 may be a router for optical communication, a router for asymmetric digital subscriber line (ADSL), a modem for various kinds of communications, or the like. The communication device 925 transmits and receives signals to and from, for example, the Internet or other communication devices using a predetermined protocol such as TCP/IP. In addition, the communication network 931 to be connected to the communication device 925 is a network connected in a wired or wireless manner, and is, for example, the Internet, a home LAN, infrared communication, radio wave communication, satellite communication, or the like.

The imaging device 933 is a device that generates an image by imaging a real space using an image sensor such as a charge-coupled device (CCD) or a complementary metal oxide semiconductor (CMOS), as well as various members such as one or more lenses for controlling the formation of a subject image on the image sensor, for example. The imaging device 933 may be a device that captures still images and may also be a device that captures moving images.

The sensor 935 is any of various sensors such as an acceleration sensor, a gyro sensor, a geomagnetic sensor, an optical sensor, or a sound sensor, for example. The sensor 935 acquires information regarding the state of the information processing device 100, such as the attitude of the case of the information processing device 100, as well as information regarding the environment surrounding the information processing device 100, such as brightness or noise surrounding the information processing device 100, for example. The sensor 935 may also include a global positioning system (GPS) sensor that receives GPS signals and measures the latitude, longitude, and altitude of the device.

The foregoing thus illustrates an exemplary hardware configuration of the information processing device 100. Each of the above components may be realized with general-purpose members or hardware specialized in the function of each component. Such a configuration may also be modified as appropriate in accordance with the technological level at the time of the implementation.

4. CONCLUSION

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below (1)

An information processing device, including:

an acquiring unit configured to identify and acquire input information from each of a plurality of target regions serving as acquisition sources of the input information, for each of the target regions; and a control unit configured to associate each of at least one or more applications with any of the plurality of target regions, and allocate the input information acquired from the target region to the application associated with the target region.

(2)

The information processing device according to (1), in which the acquiring unit identifies and acquires an acoustic input arriving from the target region as the input information for each of the target regions, and the control unit allocates the acoustic input acquired from the target region to the application associated with the target region.

(3)

The information processing device according to (2), including a plurality of microphones configured to collect the acoustic input, in which the acquiring unit identifies and acquires the acoustic input arriving from each of the plurality of target regions for each of the target regions on a basis of a sound collection result of each of the plurality of microphones.

(4)

The information processing device according to (2) or (3), in which the control unit outputs an acoustic output from the application associated with the target region, toward the target region.

(5)

The information processing device according to (4), including a plurality of speakers configured to output the acoustic output, in which the control unit causes the acoustic output to be output from a speaker corresponding to the target region serving as an output destination of the acoustic output among the plurality of speakers.

(6)

The information processing device according to (4) or (5), in which the control unit controls an output ratio of the acoustic output from each of a plurality of the applications for each of the target regions.

(7)

The information processing device according to any one of (2) to (6), in which the control unit decides the target region serving as an acquisition source of the acoustic input to the application in accordance with position information indicating at least any of a position and a direction of a display object used by the application for presenting display information, the display object being displayed in a display region.

(8)

The information processing device according to (7), in which the control unit dynamically updates the target region serving as the acquisition source of the acoustic input to the application corresponding to the display object in accordance with a change in the position information of the display object.

(9)

The information processing device according to (8), in which the control unit switches control for dynamically updating the target region between enabled and disabled states on a basis of an instruction from a user.

(10)

The information processing device according to any one of (7) to (9), including a display unit configured to project a screen on which the display object is displayed onto a projection plane including the display region and causes the display region to display the display object, in which the control unit updates the screen in accordance with an analysis result of a captured image of the display region.

(11)

The information processing device according to (1), in which the acquiring unit identifies and acquires a video input in which the target region is captured as the input information for each of the target regions, and the control unit allocates the video input acquired from the target region to the application associated with the target region.

(12)

The information processing device according to any one of (1) to (11), in which, in a case in which there are a plurality of the applications serving as candidates for an allocation destination of the input information, the control unit decides the application to which the input information is allocated in accordance with priorities of the plurality of applications.

(13)

The information processing device according to (12), in which the control unit decides the priorities of the plurality of applications on a basis of a relative position relation between respective display objects used by the plurality of applications serving as the candidates for presenting the display information.

(14)

The information processing device according to (12) or (13).

in which the control unit updates the priority in accordance with acquisition of the input information.

(15)

The information processing device according to (12) or (13), in which the control unit updates the priority in accordance with addition or deletion of the application serving as the candidate.

(16)

The information processing device according to any one of (1) to (15), in which the control unit causes a notifying unit configured to notify a user of information, to notify of notification information for presenting the target region.

(17)

The information processing device according to any one of (1) to (16), in which the control unit updates an association between the target region and the application on a basis of an instruction related to a change in the association.

(18)

The information processing device according to any one of (1) to (17), in which the control unit receives an instruction from a user for at least a part of the target regions, and updates at least any of a position and a size of the target regions.

(19)

An information processing method, including:

identifying and acquiring input information from each of a plurality of target regions serving as acquisition sources of the input information, for each of the target regions; and associating, by a processor, each of at least one or more applications with any of the plurality of target regions, and allocating the input information acquired from the target region to the application associated with the target region.

(20)

A program causing a computer to execute:

identifying and acquiring input information from each of a plurality of target regions serving as acquisition sources of the input information, for each of the target regions; and associating each of at least one or more applications with any of the plurality of target regions, and allocating the input information acquired from the target region to the application associated with the target region.

REFERENCE SIGNS LIST 100 information processing device
110 input unit
111 imaging unit
113 sound collecting unit
120 control unit
121 input analyzing unit
122 detecting unit
123 input source determining unit
124 input destination specifying unit
125 allocation control unit
126 process executing unit
127 output control unit
130 output unit
131 video output unit
133 sound output unit
150 second imaging unit
220 control unit
221 input analyzing unit
222 detecting unit
223 input source determining unit
224 input destination specifying unit
225 control unit
226 process executing unit
227 output control unit

The invention claimed is:

1. An information processing device, comprising:
an acquiring unit configured to identify and acquire input information from each target region of a plurality of target regions serving as acquisition sources of the input information, for each target of the plurality of target regions; and
a control unit configured to associate each of at least one or more applications with any target region of the plurality of target regions, and allocate the input information acquired from the target region to the application associated with the target region,
wherein the control unit decides the target region serving as an acquisition source of the input information to the associated application in accordance with position information indicating a size of a display object used by the associated application for presenting display information, the display object being displayed in a display region, and
wherein the acquiring unit and the control unit are each implemented via at least one processor.

2. The information processing device according to claim 1,
wherein the acquiring unit identifies and acquires an acoustic input arriving from the target region as the input information for each target region of the plurality of target regions, and
the control unit allocates the acoustic input acquired from the target region to the application associated with the target region.

3. The information processing device according to claim 2, further comprising:
a plurality of microphones configured to collect the acoustic input,
wherein the acquiring unit identifies and acquires the acoustic input arriving from each target region of the plurality of target regions for each target region of the plurality of target regions on a basis of a sound collection result of each microphone of the plurality of microphones.

4. The information processing device according to claim 2,
wherein the control unit outputs an acoustic output from the application associated with the target region, toward the target region.

5. The information processing device according to claim 4, further comprising:
a plurality of speakers configured to output the acoustic output,
wherein the control unit causes the acoustic output to be output from a speaker corresponding to the target region serving as an output destination of the acoustic output among the plurality of speakers.

6. The information processing device according to claim 4,
wherein the control unit controls an output ratio of the acoustic output from each application of a plurality of the applications for each target region of the plurality of target regions.

7. The information processing device according to claim 2,
wherein the control unit decides the target region serving as the acquisition source of the acoustic input to the associated application in accordance with the position information further indicating at least one of a position or a direction of the display object used by the application for presenting display information.

8. The information processing device according to claim 7,
wherein the control unit dynamically updates the target region serving as the acquisition source of the acoustic input to the application corresponding to the display object in accordance with a change in the position information of the display object.

9. The information processing device according to claim 8,
wherein the control unit switches control for dynamically updating the target region between enabled and disabled states on a basis of an instruction from a user.

10. The information processing device according to claim 7, further comprising:
a display unit configured to project a screen on which the display object is displayed onto a projection plane including the display region and causes the display region to display the display object,
wherein the control unit updates the screen in accordance with an analysis result of a captured image of the display region, and
wherein the display unit is implemented via at least one processor.

11. The information processing device according to claim 1,
wherein the acquiring unit identifies and acquires a video input in which the target region is captured as the input information for each of the target regions, and
the control unit allocates the video input acquired from the target region to the application associated with the target region.

12. The information processing device according to claim 1,
wherein, in a case in which there are a plurality of the applications serving as candidates for an allocation destination of the input information, the control unit decides the application to which the input information is allocated in accordance with priorities of the plurality of applications.

13. The information processing device according to claim 12,
wherein the control unit decides the priorities of the plurality of applications on a basis of a relative position relation between respective display objects used by the plurality of applications serving as the candidates for presenting the display information.

14. The information processing device according to claim 12,
wherein the control unit updates the priority in accordance with acquisition of the input information.

15. The information processing device according to claim 12,
wherein the control unit updates the priority in accordance with addition or deletion of the application serving as the candidate.

16. The information processing device according to claim 1,
wherein the control unit causes a notifying unit configured to notify a user of information, to notify of notification information for presenting the target region.

17. The information processing device according to claim 1,
wherein the control unit updates an association between the target region and the application on a basis of an instruction related to a change in the association.

18. The information processing device according to claim 1,
wherein the control unit receives an instruction from a user for at least a part of the target regions, and updates at least any of a position and a size of the target regions.

19. An information processing method, comprising:
identifying and acquiring input information from each target region of a plurality of target regions serving as acquisition sources of the input information, for each target region of the plurality of target regions;

associating, by a processor, each of at least one or more applications with any target region of the plurality of target regions, and allocating the input information acquired from the target region to the application associated with the target region; and deciding the target region serving as an acquisition source of the input information to the associated application in accordance with position information indicating a size of a display object used by the associated application for presenting display information, the display object being displayed in a display region.

20. A non-transitory computer-readable medium having embodied thereon a program, which when executed by a computer causes the computer to execute a method, the method comprising:

identifying and acquiring input information from each target region of a plurality of target regions serving as acquisition sources of the input information, for each target region of the plurality of target regions;

associating each of at least one or more applications with any target region of the plurality of target regions, and allocating the input information acquired from the target region to the application associated with the target region; and deciding the target region serving as an acquisition source of the input information to the associated application in accordance with position information indicating a size of a display object used by the associated application for presenting display information, the display object being displayed in a display region.

* * * * *